US012615416B2

(12) United States Patent
Patel

(10) Patent No.: US 12,615,416 B2
(45) Date of Patent: Apr. 28, 2026

(54) SYSTEMS AND METHODS FOR PREVENTING SPOILERS IN A RESULTS DISPLAY FOR A TOURNAMENT-STYLE COMPETITION BY SELECTIVELY BLACKING OUT COMPETITOR RESULTS

(71) Applicant: Adeia Guides Inc., San Jose, CA (US)

(72) Inventor: Milan Indu Patel, Santa Clara, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/923,365

(22) Filed: Oct. 22, 2024

(65) Prior Publication Data

US 2025/0047940 A1     Feb. 6, 2025

Related U.S. Application Data

(63) Continuation of application No. 17/992,243, filed on Nov. 22, 2022, now Pat. No. 12,160,636, which is a
(Continued)

(51) Int. Cl.
*H04N 21/454*          (2011.01)
*H04N 21/45*          (2011.01)
(Continued)

(52) U.S. Cl.
CPC ..... *H04N 21/4542* (2013.01); *H04N 21/4532* (2013.01); *H04N 21/47214* (2013.01); *H04N 21/47217* (2013.01); *H04N 21/482* (2013.01)

(58) Field of Classification Search
CPC ........... H04N 21/4758; H04N 21/4788; H04N 21/4781; H04N 21/4784; H04N 21/812; H04N 21/84; H04N 21/25891
See application file for complete search history.

(56) References Cited

U.S. PATENT DOCUMENTS 6,239,794 B1     5/2001  Yuen et al.
6,564,378 B1     5/2003  Satterfield et al.
(Continued)

FOREIGN PATENT DOCUMENTS

EP          2079236 A2    7/2009
WO          0033576 A1    6/2000
WO        2000033576       6/2000

OTHER PUBLICATIONS

PCT International Search Report for International Application No. PCT/US2017/067439, dated Apr. 23, 2018 (16 pages).
(Continued)

*Primary Examiner* — Jason Salce
(74) *Attorney, Agent, or Firm* — HG LAW LLP

(57)          ABSTRACT

Systems and methods are disclosed herein for generating for display depictions of tournament-style competitions restricting user's access to any content that may spoil the results of the tournament. A user may request to view a display that contains a tournament and participating competitors. Requests may be received from users to view recordings of tournament competitions or a results display with the tournament bracket displayed. The media guidance application may access recorded versions of competitions from internal and external directories. Furthermore, the media guidance application may compare user viewing progress data and competitor progress data to ensure the user does not prematurely view results of any competitions of interest to the user. If the media guidance application determines a user's progress is less than the progress of the user's favorite team, visual representations of the competitions that may spoil the outcome of the user's favorite team's competition may be blacked out.

20 Claims, 13 Drawing Sheets

Related U.S. Application Data continuation-in-part of application No. 17/480,631, filed on Sep. 21, 2021, now Pat. No. 11,540,015, which is a continuation of application No. 16/771, 517, filed as application No. PCT/US2017/067439 on Dec. 19, 2017, now Pat. No. 11,153,647.

(51) Int. Cl.
   *H04N 21/472*      (2011.01)
   *H04N 21/482*      (2011.01)

(56)                References Cited

U.S. PATENT DOCUMENTS

| | | | |
|---|---|---|---|
| 7,165,098 | B1 | 1/2007 | Boyer et al. |
| 7,370,343 | B1 | 5/2008 | Ellis |
| 7,761,892 | B2 | 7/2010 | Ellis et al. |
| 8,046,801 | B2 | 10/2011 | Ellis et al. |
| 11,153,647 | B2 * | 10/2021 | Patel ..................... G11B 27/102 |
| 11,540,015 | B2 * | 12/2022 | Patel ....................... G06F 16/00 |
| 12,160,636 | B2 * | 12/2024 | Patel ................ H04N 21/47217 |
| 2002/0174430 | A1 | 11/2002 | Ellis et al. |
| 2003/0186744 | A1 * | 10/2003 | Bradell ............... G07F 17/3244 |
| | | | 463/42 |
| 2004/0043810 | A1 | 3/2004 | Perlin et al. |
| 2005/0251827 | A1 | 11/2005 | Ellis et al. |
| 2006/0282852 | A1 | 12/2006 | Purpura et al. |
| 2007/0044133 | A1 | 2/2007 | Hodecker |
| 2007/0122108 | A1 | 5/2007 | Bontempi |
| 2007/0154163 | A1 | 7/2007 | Cordray |
| 2007/0214478 | A1 | 9/2007 | Feldstein et al. |
| 2008/0024420 | A1 | 1/2008 | Nakai et al. |
| 2008/0195664 | A1 | 8/2008 | Maharajh et al. |
| 2008/0209472 | A1 | 8/2008 | Shanks et al. |
| 2008/0229352 | A1 | 9/2008 | Pino et al. |
| 2008/0270886 | A1 | 10/2008 | Gossweiler et al. |
| 2009/0158350 | A1 | 6/2009 | Decamp |
| 2009/0318219 | A1 * | 12/2009 | Koustas ............. G07F 17/3295 |
| | | | 463/23 |
| 2010/0083301 | A1 | 4/2010 | Swenson |
| 2010/0153885 | A1 | 6/2010 | Yates |
| 2012/0129610 | A1 | 5/2012 | Mazursky et al. |
| 2013/0116044 | A1 | 5/2013 | Schwartz |
| 2013/0297706 | A1 | 11/2013 | Arme et al. |
| 2014/0121013 | A1 | 5/2014 | Carson et al. |
| 2015/0082344 | A1 | 3/2015 | Antalek |
| 2016/0082348 | A1 | 3/2016 | Kehoe et al. |
| 2016/0212492 | A1 | 7/2016 | Mori |
| 2016/0371361 | A1 | 12/2016 | Chino et al. |
| 2018/0048936 | A1 | 2/2018 | Gupta et al. |
| 2019/0191199 | A1 | 6/2019 | Patel |
| 2021/0056750 | A1 | 2/2021 | Rowley |
| 2021/0176529 | A1 | 6/2021 | Patel |
| 2022/0007076 | A1 | 1/2022 | Patel |
| 2023/0164390 | A1 | 5/2023 | Patel |
| 2025/0047940 | A1 * | 2/2025 | Patel ................. H04N 21/4532 |

OTHER PUBLICATIONS

International Preliminary Report on Patentability received for PCT Patent Application No. PCT/US17/67439, mailed on Jul. 2, 2020, 8 pages.

* cited by examiner

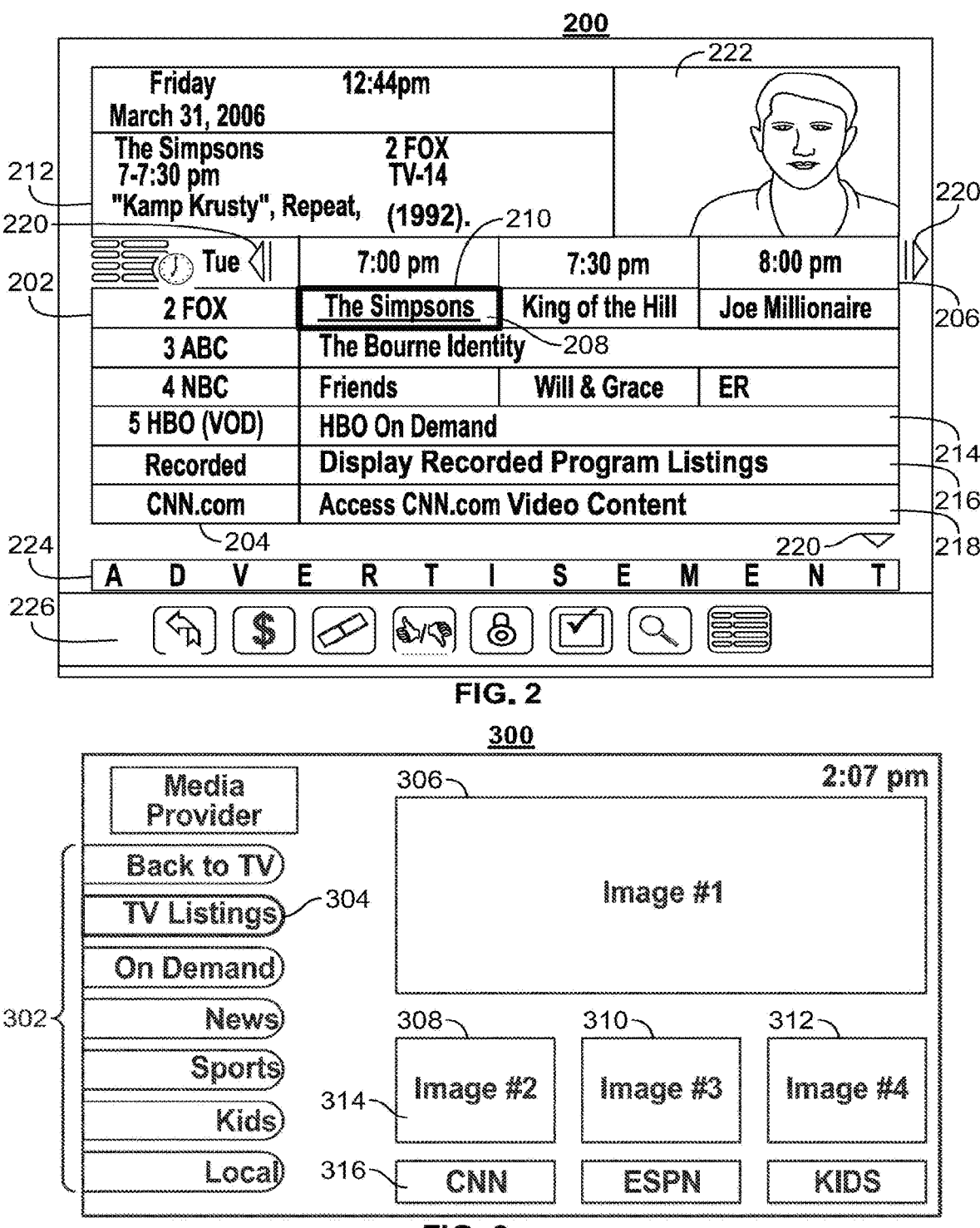

200

Friday
March 31, 2006          12:44pm

The Simpsons        2 FOX
7-7:30 pm           TV-14
"Kamp Krusty", Repeat,   (1992).

| ☰ 🕐 Tue ◁ ‖ | 7:00 pm | 7:30 pm | 8:00 pm |
|---|---|---|---|
| 2 FOX | The Simpsons | King of the Hill | Joe Millionaire |
| 3 ABC | The Bourne Identity | | |
| 4 NBC | Friends | Will & Grace | ER |
| 5 HBO (VOD) | HBO On Demand | | |
| Recorded | Display Recorded Program Listings | | |
| CNN.com | Access CNN.com Video Content | | |

ADVERTISEMENT

Media Provider

| | 2:07 pm |

Back to TV
TV Listings
On Demand
News
Sports
Kids
Local

Image #1

Image #2     Image #3     Image #4

CNN          ESPN         KIDS

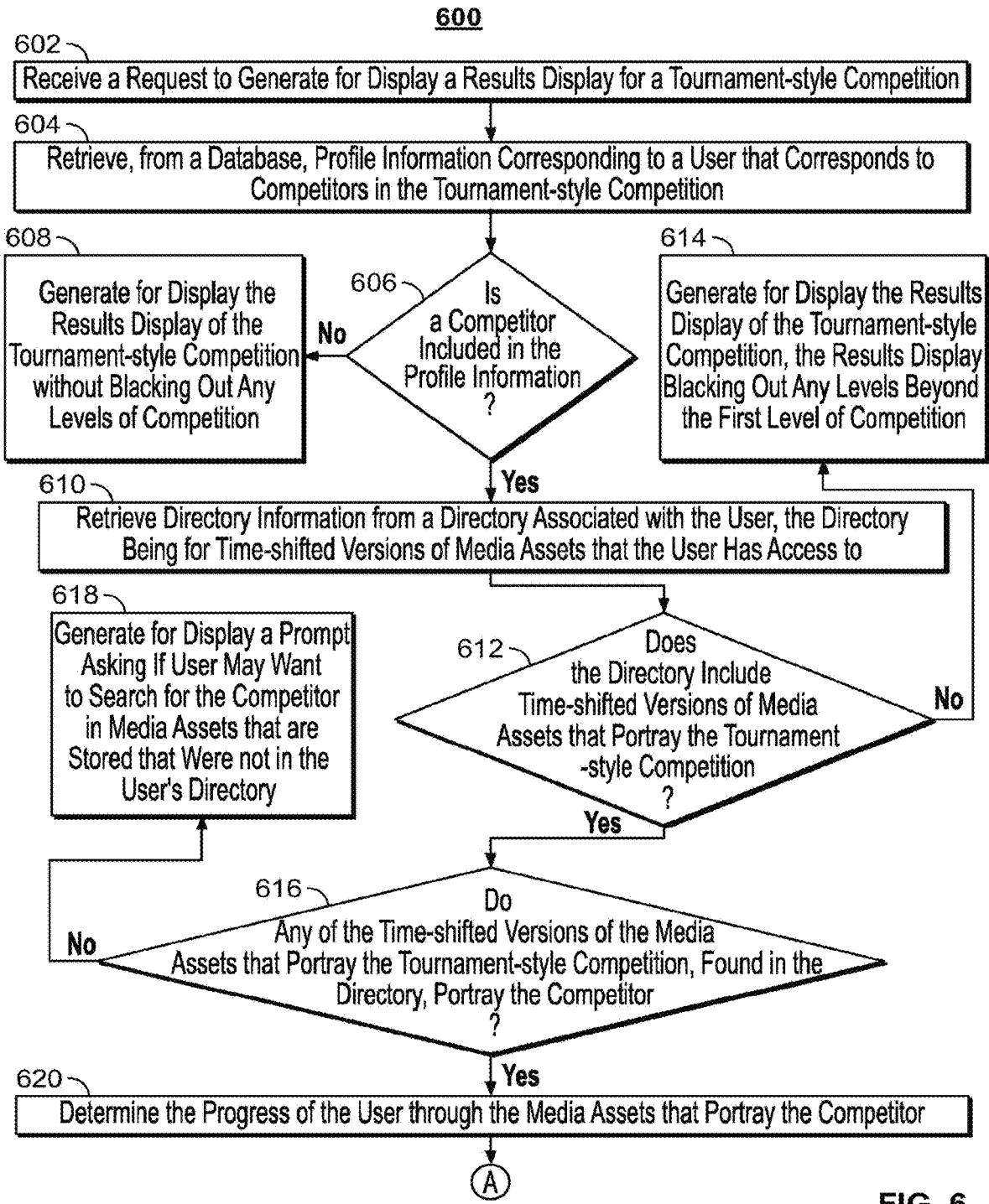

602 — Receive a Request to Generate for Display a Results Display for a Tournament-style Competition 604 — Retrieve, from a Database, Profile Information Corresponding to a User that Corresponds to Competitors in the Tournament-style Competition 606 — Is a Competitor Included in the Profile Information ?

No

608 — Generate for Display the Results Display of the Tournament-style Competition without Blacking Out Any Levels of Competition 614 — Generate for Display the Results Display of the Tournament-style Competition, the Results Display Blacking Out Any Levels Beyond the First Level of Competition

Yes

610 — Retrieve Directory Information from a Directory Associated with the User, the Directory Being for Time-shifted Versions of Media Assets that the User Has Access to 612 — Does the Directory Include Time-shifted Versions of Media Assets that Portray the Tournament-style Competition ?

No

Yes

618 — Generate for Display a Prompt Asking If User May Want to Search for the Competitor in Media Assets that are Stored that Were not in the User's Directory 616 — Do Any of the Time-shifted Versions of the Media Assets that Portray the Tournament-style Competition, Found in the Directory, Portray the Competitor ?

No

Yes

620 — Determine the Progress of the User through the Media Assets that Portray the Competitor

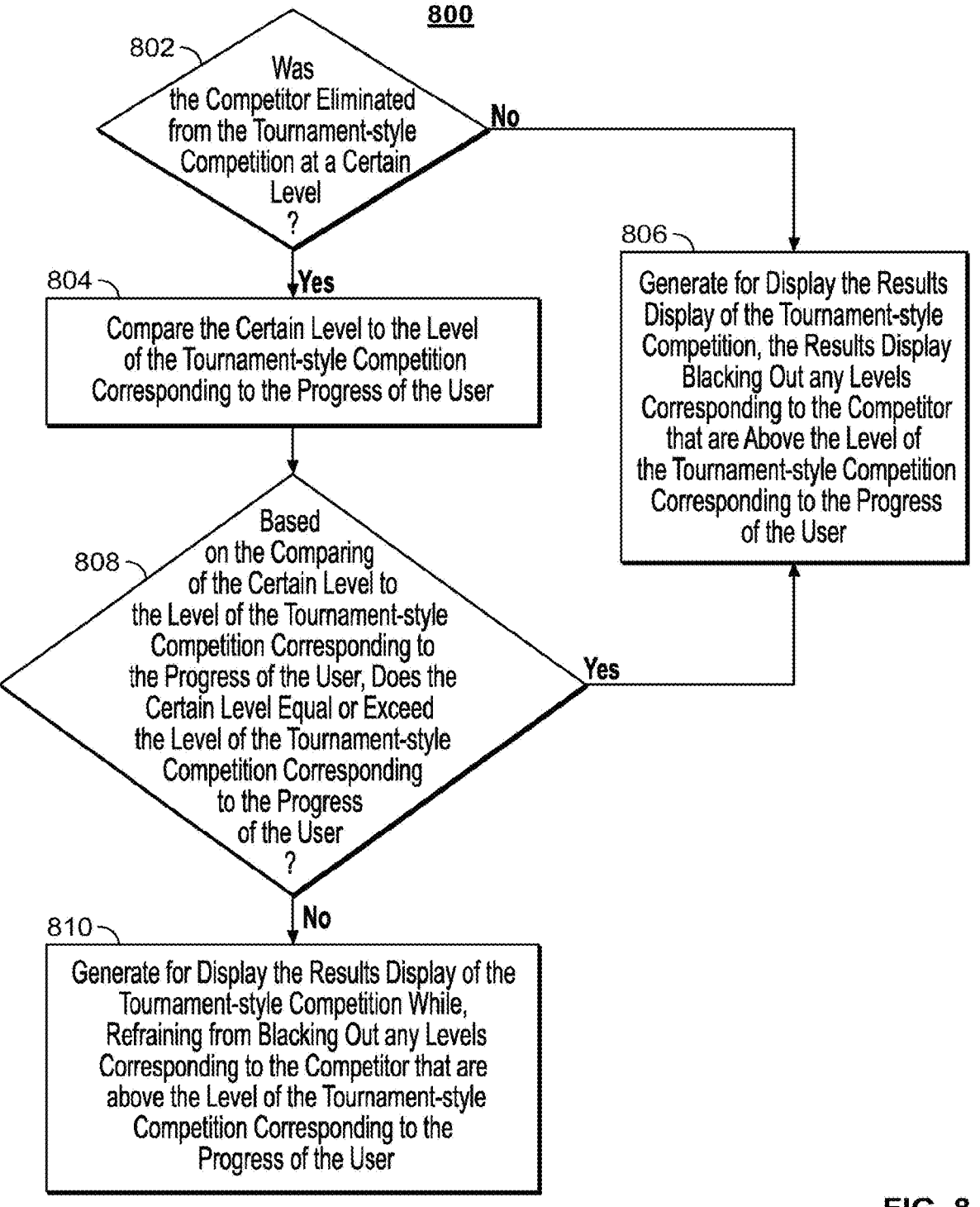

800

802 — Was the Competitor Eliminated from the Tournament-style Competition at a Certain Level ?

No →

806 — Generate for Display the Results Display of the Tournament-style Competition, the Results Display Blacking Out any Levels Corresponding to the Competitor that are Above the Level of the Tournament-style Competition Corresponding to the Progress of the User ↓ Yes 804 — Compare the Certain Level to the Level of the Tournament-style Competition Corresponding to the Progress of the User 808 — Based on the Comparing of the Certain Level to the Level of the Tournament-style Competition Corresponding to the Progress of the User, Does the Certain Level Equal or Exceed the Level of the Tournament-style Competition Corresponding to the Progress of the User ?

Yes →

No ↓

810 — Generate for Display the Results Display of the Tournament-style Competition While, Refraining from Blacking Out any Levels Corresponding to the Competitor that are above the Level of the Tournament-style Competition Corresponding to the Progress of the User

FIG. 8

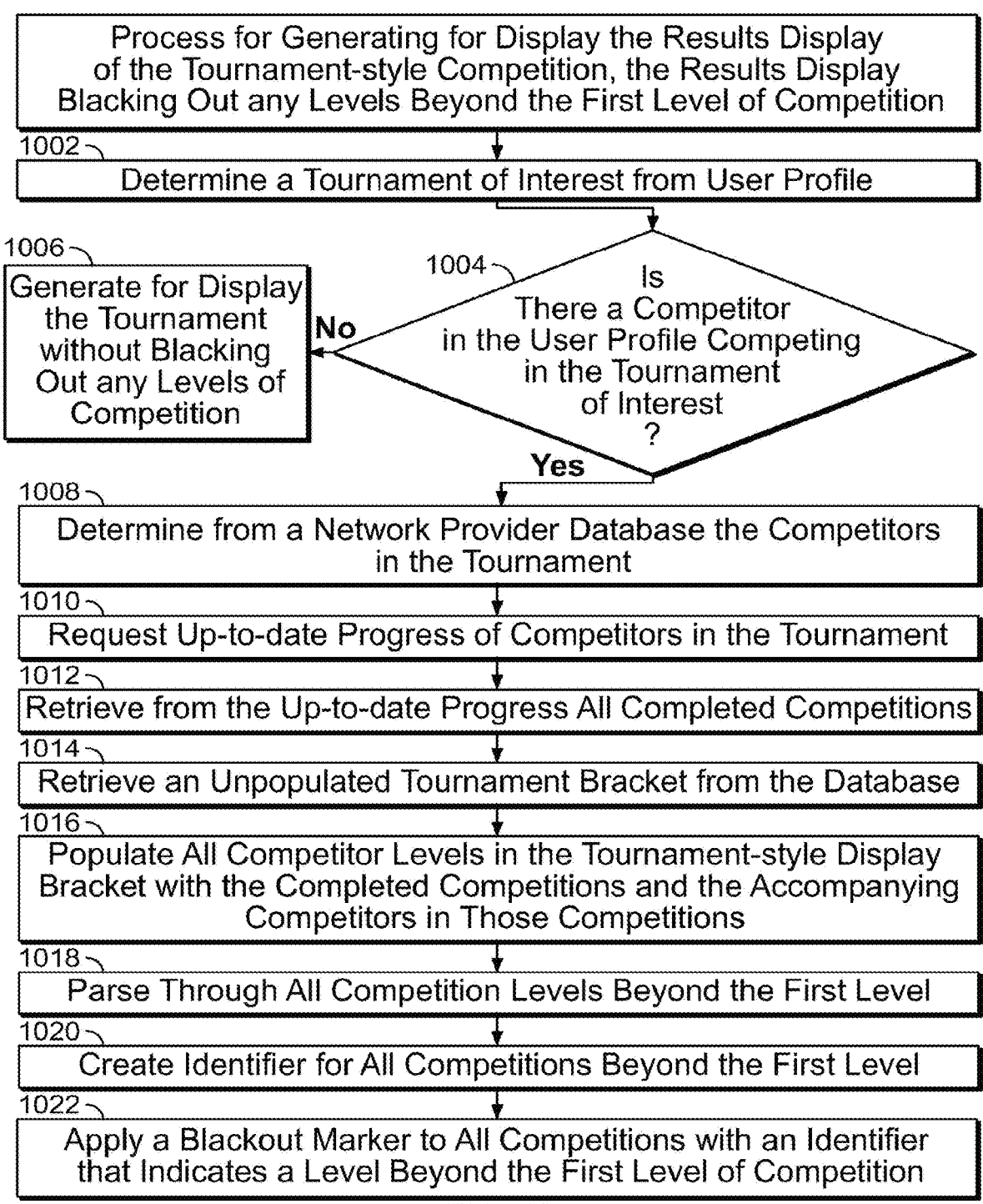

1000

Process for Generating for Display the Results Display of the Tournament-style Competition, the Results Display Blacking Out any Levels Beyond the First Level of Competition 1002 — Determine a Tournament of Interest from User Profile 1004 — Is There a Competitor in the User Profile Competing in the Tournament of Interest ?

No

1006 — Generate for Display the Tournament without Blacking Out any Levels of Competition Yes 1008 — Determine from a Network Provider Database the Competitors in the Tournament 1010 — Request Up-to-date Progress of Competitors in the Tournament 1012 — Retrieve from the Up-to-date Progress All Completed Competitions 1014 — Retrieve an Unpopulated Tournament Bracket from the Database 1016 — Populate All Competitor Levels in the Tournament-style Display Bracket with the Completed Competitions and the Accompanying Competitors in Those Competitions 1018 — Parse Through All Competition Levels Beyond the First Level 1020 — Create Identifier for All Competitions Beyond the First Level 1022 — Apply a Blackout Marker to All Competitions with an Identifier that Indicates a Level Beyond the First Level of Competition

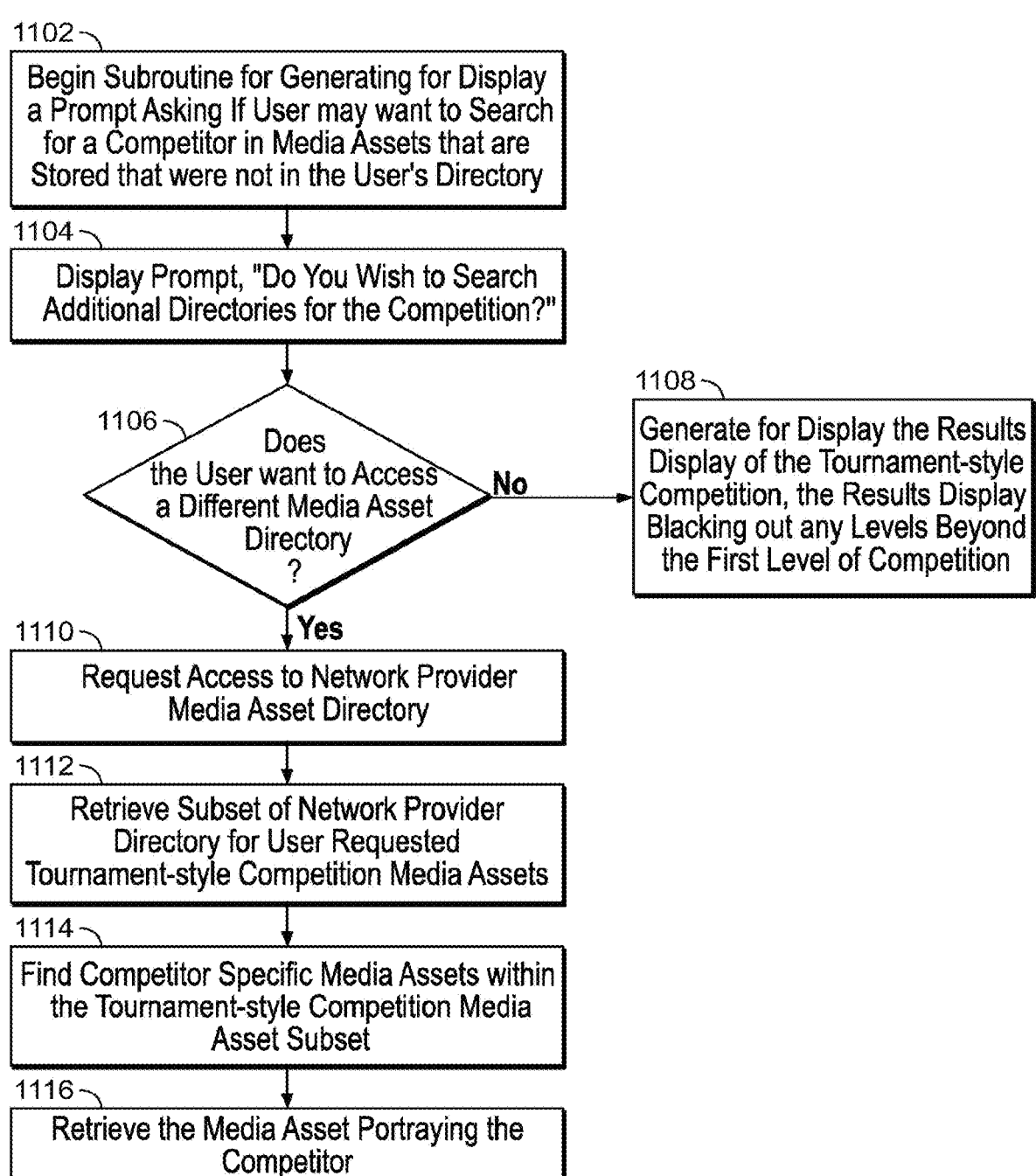

1102 ⏤
Begin Subroutine for Generating for Display a Prompt Asking If User may want to Search for a Competitor in Media Assets that are Stored that were not in the User's Directory 1104 ⏤
Display Prompt, "Do You Wish to Search Additional Directories for the Competition?"

1106 ⏤
Does the User want to Access a Different Media Asset Directory ?

No

1108 ⏤
Generate for Display the Results Display of the Tournament-style Competition, the Results Display Blacking out any Levels Beyond the First Level of Competition Yes 1110 ⏤
Request Access to Network Provider Media Asset Directory 1112 ⏤
Retrieve Subset of Network Provider Directory for User Requested Tournament-style Competition Media Assets 1114 ⏤
Find Competitor Specific Media Assets within the Tournament-style Competition Media Asset Subset 1116 ⏤
Retrieve the Media Asset Portraying the Competitor

FIG. 11

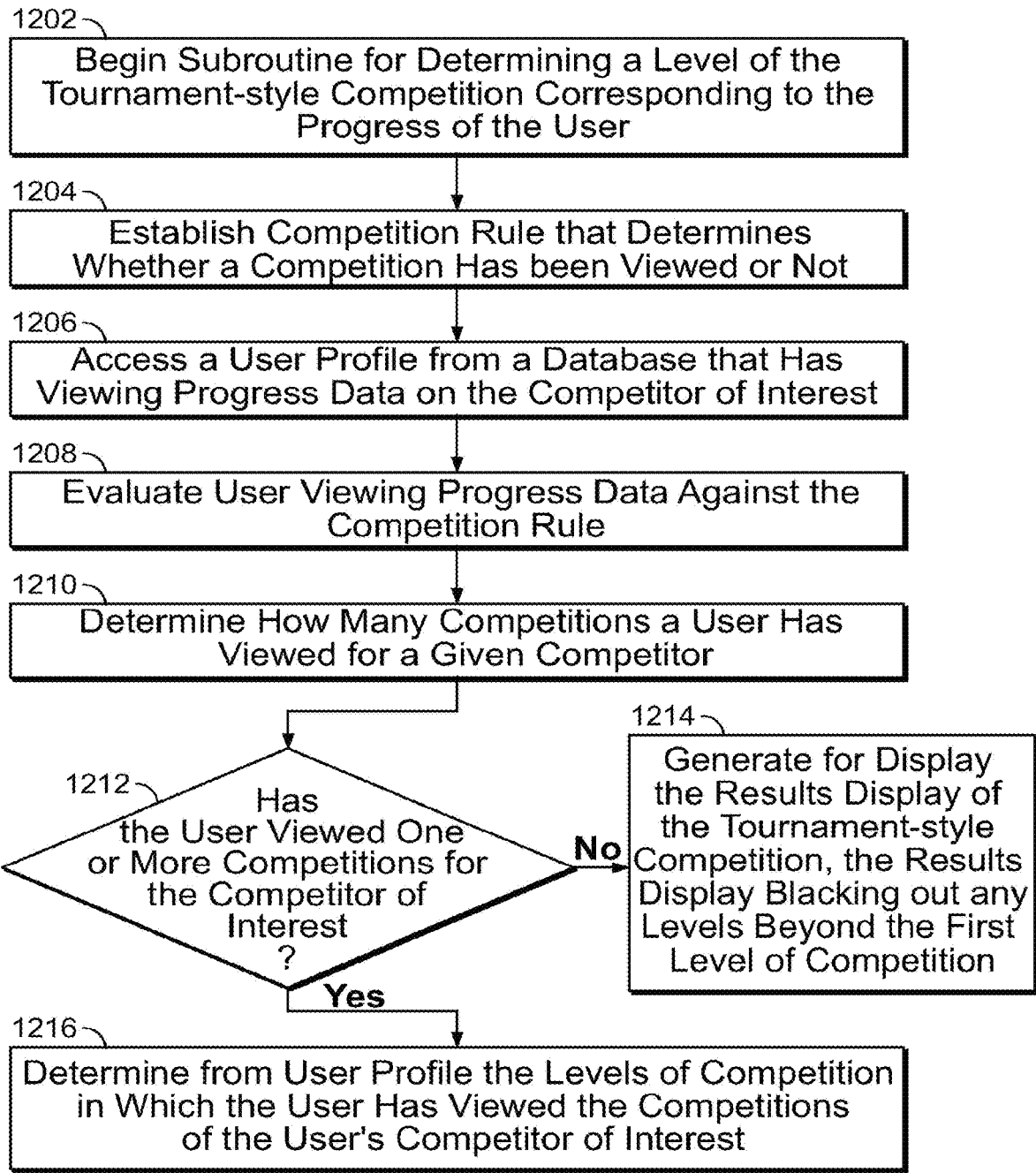

1200

1202 — Begin Subroutine for Determining a Level of the Tournament-style Competition Corresponding to the Progress of the User 1204 — Establish Competition Rule that Determines Whether a Competition Has been Viewed or Not 1206 — Access a User Profile from a Database that Has Viewing Progress Data on the Competitor of Interest 1208 — Evaluate User Viewing Progress Data Against the Competition Rule 1210 — Determine How Many Competitions a User Has Viewed for a Given Competitor 1212 — Has the User Viewed One or More Competitions for the Competitor of Interest?

1214 — Generate for Display the Results Display of the Tournament-style Competition, the Results Display Blacking out any Levels Beyond the First Level of Competition No Yes 1216 — Determine from User Profile the Levels of Competition in Which the User Has Viewed the Competitions of the User's Competitor of Interest

FIG. 12

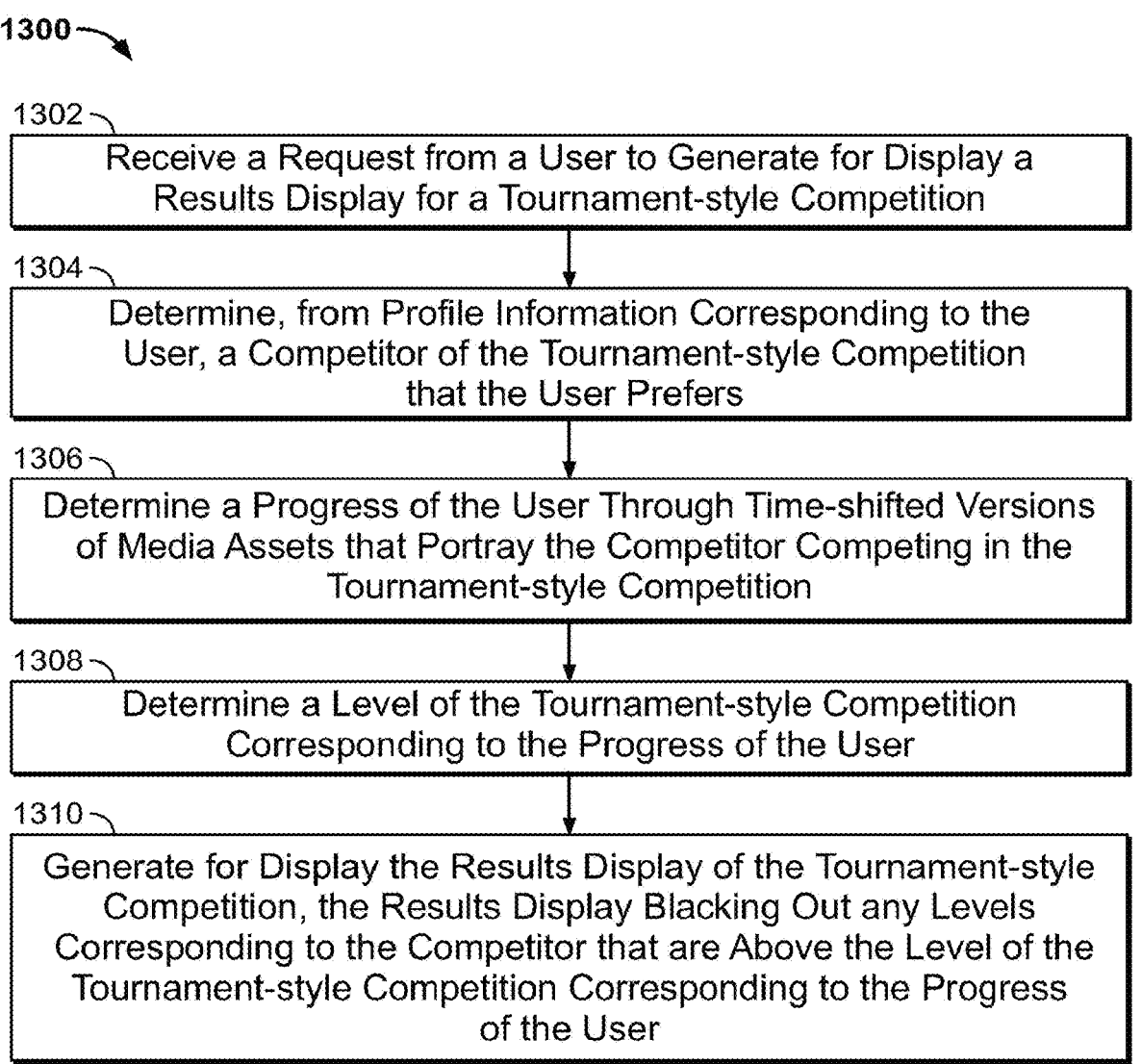

1300

1302
Receive a Request from a User to Generate for Display a Results Display for a Tournament-style Competition 1304
Determine, from Profile Information Corresponding to the User, a Competitor of the Tournament-style Competition that the User Prefers 1306
Determine a Progress of the User Through Time-shifted Versions of Media Assets that Portray the Competitor Competing in the Tournament-style Competition 1308
Determine a Level of the Tournament-style Competition Corresponding to the Progress of the User 1310
Generate for Display the Results Display of the Tournament-style Competition, the Results Display Blacking Out any Levels Corresponding to the Competitor that are Above the Level of the Tournament-style Competition Corresponding to the Progress of the User

FIG. 13

SYSTEMS AND METHODS FOR PREVENTING SPOILERS IN A RESULTS DISPLAY FOR A TOURNAMENT-STYLE COMPETITION BY SELECTIVELY BLACKING OUT COMPETITOR RESULTS

CROSS-REFERENCE TO RELATED APPLICATIONS

This application is a continuation of U.S. patent application Ser. No. 17/992,243, filed Nov. 22, 2022, which is a continuation in-part of U.S. patent application Ser. No. 17/480,631, filed Sep. 21, 2021, (now U.S. Pat. No. 11,540, 015), which is a continuation of U.S. patent application Ser. No. 16/771,517, filed Jun. 10, 2020, (now U.S. Pat. No. 11,153,647), which is a national stage application under 35 U.S.C. § 371 of International Application PCT/US2017/067439, filed Dec. 19, 2017. The disclosures of which are hereby incorporated by reference herein in their entireties.

BACKGROUND

Users who are interested in tournament-style competitions (e.g., competitions that involve brackets, such as the college basketball "March Madness" tournament, or competitions that otherwise cause teams to get eliminated from contention at different levels) often record some or all of the tournament-style competitions. While the related art enables a user to record specific games from a tournament-style competition (e.g., including a favorite team), the related art is silent on how listings of recorded games are presented to the user. Moreover, the related art does not leverage a directory of listings of recorded games, or progress of the user through those listings, to manage how a results display relating to a tournament-style competition is displayed to the user.

SUMMARY

Accordingly, systems and methods are described herein for a media guidance application that prevents spoilers of tournament-style competition by selectively displaying outcomes based on user viewing progress through time-shifted media assets of a competitor of interest. For example, if a user views a results display, such as a bracket depicting outcomes of elimination games in a tournament-style competition, the systems and methods provided herein selectively black out portions of the bracket that correspond to unviewed recordings of games, thus avoiding spoiling the outcome of the recordings for the users. Thus, users no longer need worry about prematurely knowing the status of their favorite team in a tournament-style competition by virtue of reviewing a results display. The user can watch games at his or her own pace and see his or her viewing options clearly displayed in a designated tournament-style interface display.

For example, the media guidance application may store user preferences about what competitor (e.g., favorite NCAA basketball team) the user wants to track throughout a tournament-style competition (e.g., March Madness Bracket). The media guidance application may then use the user preference to determine what levels of competition within a tournament will be displayed for the user. Additionally, the media guidance application may black out, on the results display, any of the user's favorite competitor's games if the user has not yet viewed a corresponding time-shifted version (e.g., recording). The media guidance application may generate for display, within the user interface that is designated to shows the available time-shifted competitions, a level (e.g., the round in the tournament) of those competitions, and whether or not a user has viewed media assets corresponding to that level. The media guidance application may also receive input from a remote that toggles between the tournament-style interface and the competitions being played.

In some aspects, the media guidance application may receive a request to generate for display the results display for the tournament-style competition. For example, the media guidance application may determine that a user is interested in a competition called the National Collegiate Athletic Association (NCAA) March Madness competition, which is a college basketball tournament occurring in the United States, and the media guidance application may receive user input requesting that a tournament bracket corresponding to March Madness be displayed on a television.

The media guidance application may, in response to receiving the request to generate for display the results display, retrieve, from a database, profile information corresponding to the user that corresponds to competitors in the tournament-style competition. For example, the media guidance application may determine the collegiate teams that are competitors in the March Madness basketball tournament. In some embodiments, the media guidance application may retrieve additional profile information corresponding to the additional user. For example, the media guidance application may detect multiple users associated with a stored profile. The media guidance application may receive an initial request from a first user associated with a user profile designating user data. The media guidance application may also receive an additional user request thus providing additional profile information for an additional user, who may have different preferences and settings than the first user.

In some embodiments, the media guidance application may determine, from the profile information, the competitor. For example, the media guidance application may retrieve the profile information associated with any user associated with an account accessible by the media guidance application. For example, the media guidance application may receive a request from a specific user, i.e., the father in a family where all family members have user profiles, whose information is located in a user profile. The media guidance application may access the father's profile and determine that the Gonzaga University basketball team is stored as the father's preferred team.

The media guidance application may retrieve directory information from a directory associated with the user, the directory being for time-shifted versions of media assets that the user has access to. For example, the media guidance application may retrieve the user profile for the father and may find a directory of various recorded media assets, such as shows, games, movies, etc.

The media guidance application may determine, from the directory information, whether time-shifted versions of media assets that portray the tournament-style competition are indicated by the directory information. For example, the media guidance application may parse through the directory of recorded shows, games, movies, etc., and may determine that games from a tournament-style competition, such as March Madness, are referenced by the directory.

The media guidance application may, in response to determining that the time-shifted versions of the media assets that portray the tournament-style competition are indicated by the directory information, determine whether, of the time-shifted versions of the media assets that portray the tournament-style competition, any media assets portray the competitor. For example, after the media guidance application parses through the directory to determine recorded March Madness games, the media guidance application may further parse through the March Madness recordings in the directory to identify recorded games for the user's favorite team (e.g., Gonzaga games). In some embodiments, the media guidance application may determine a subset of the time-shifted versions of the media assets that portray the tournament-style competition that were caused to be stored based on criteria set by the user. For example, the media guidance application may access a list of recordings on a user profile. The media guidance application may then determine which of those recordings are Gonzaga March Madness games.

The media guidance application may, in response to determining that, of the time-shifted versions of the media assets that portray the tournament-style competition, there are media assets that portray the competitor, determine the progress of the user through the media assets that portray the competitor. For example, the media guidance application may retrieve information indicating that Gonzaga is presently playing in the third round of March Madness, but the user has viewed only one game in the first round of the March Madness tournament-style competition.

The media guidance application may determine a level of the tournament-style competition corresponding to the progress of the user. For example, the media guidance application may determine that the user has viewed the first-round game, but has not viewed games beyond the first-round game, even though Gonzaga may have made it to the third round.

The media guidance application may generate for display the results display of the tournament-style competition, the results display blacking out any levels corresponding to the competitor that are above the level of the tournament-style competition corresponding to the progress of the user. For example, if Gonzaga has made it to the third round of March Madness, but the user has viewed only the first round, the media guidance application may display on a television a bracket with the first-round game matchups clearly indicated (including the results of those matchups), but the media guidance application may black out the second- and third-round matchups (including, or at least, their results). This way, the user does not have the outcomes of second- and third-round matchups spoiled because the user has not yet viewed the second- or third-round game. In some embodiments, the media guidance application may determine progress of the additional user through time-shifted versions of media assets that portray the additional competitor competing in the tournament-style competition, wherein generating for display the results display of the tournament-style competition further comprises blacking out results relating to the additional competitor that go beyond the progress of the additional user. For example, the media guidance application may determine that the second user's profile indicates Duke University is the user's favorite team. The media guidance application may determine, based on that information, that Duke made the second round of March Madness, but the user has not viewed any games. The media guidance application may black out the matchup for Duke's second-round game in addition to blacking out the above-mentioned Gonzaga games.

In some embodiments, the media guidance application may determine whether an additional user has a line of sight to the results display. For example, the media guidance application may have visual recognition capabilities that identify users at a certain television. One of the users may be the Gonzaga fan, but the media guidance application may detect a different user with a separate user profile.

In some embodiments, the media guidance application, in response to determining that the additional user has a line of sight to the results display, may determine an identity of the additional user. For example, the media guidance application may retrieve the second user's profile information.

In some embodiments, the media guidance application may identify, from the additional profile information, an additional competitor, the additional competitor being of interest to the additional user. For example, the media guidance application may find that the second user is a fan of Boston College.

In some embodiments, when generating for display the results display of the tournament-style competition, the media guidance application may visually distinguish elements on the results display that correspond to the subset from all other elements on the results display. For example, the media guidance application may receive a request from the user to record Gonzaga games in March Madness. The media guidance application may thus generate for display a version of the results display of March Madness with the Gonzaga games highlighted.

In some embodiments, the media guidance application may receive a selection from the user of an element of the visually distinguished elements from the results display. For example, if the media guidance application displays the tournament bracket for the National Football League (NFL) playoffs, which is a professional league dedicated to American-style football, the user will see the matchups of his or her preferred team, say the Dallas Cowboys football team, and the preferred matchups may be highlighted. The media guidance application may receive input from the user requesting a game by the user selecting a highlighted game with a remote device.

In some embodiments, when receiving the selection, the media guidance application may determine, from the directory information, a location at which a media asset corresponding to the element is stored in memory. For example, the media guidance application may receive a request from the user to watch a Cowboys' NFL playoff first level game. The media guidance application may find the recorded game's location in a directory.

In some embodiments, the media guidance application may retrieve the media asset corresponding to the element from the location. For example, the media guidance application may retrieve a time-shifted version of the Cowboys' first level game from the previously determined location in the user's directory.

In some embodiments, the media guidance application may generate for display the media asset corresponding to the element. For example, the media guidance application may generate for display the time-shifted version of the Cowboys' first level playoff game on a television.

In some embodiments, the media guidance application may receive a selection from the user of an element that is not visually distinguished from the results display. For example, the media guidance application may receive user input to watch a game whose participants do not include a user's favorite team with name designations not highlighted in a results display on the television. For example, the media guidance application may receive a request from the user to watch an NFL playoff game that does not include the previously mentioned Dallas Cowboys but instead features the Arizona Cardinals NFL team.

In some embodiments, the media guidance application may determine, from the directory information, whether a time-shifted version of a media asset corresponding to the element was stored to memory associated with the user. For example, the media guidance application may access the directory information of recorded entities and search for the requested game. In this example, the media guidance application may search for the Arizona Cardinals' time-shifted version of their playoff game.

In some embodiments, the media guidance application, in response to determining that the time-shifted version of the media asset corresponding to the element was stored to memory associated with the user, may determine, from directory information, a location at which a media asset corresponding to the element is stored in the memory. For example, the media guidance application may identify a location in the directory that contains the time-shifted Cardinal's football game.

In some embodiments, the media guidance application may retrieve the media asset corresponding to the element from the location. For example, the media guidance application may retrieve the time-shifted Cardinals' game from the directory.

In some embodiments, the media guidance application may generate for display the media asset corresponding to the element. For example, the media guidance application may cause a display of the Cardinal's game to appear on the television.

There may be a circumstance where the media guidance application may receive a request to watch a competition from the user, but the media guidance application may be unable to locate the requested game in the directory information. For example, the media guidance application may receive a request to view the National Hockey League (NHL), which is a professional hockey league in the United States of America, Stanley Cup finals game with the Los Angeles (LA) Kings. The media guidance application may access directory information and not determine the location of a time-shifted version of the Stanley Cup finals. The media guidance application may then provide an alternate way to display the game.

In some embodiments, the media guidance application may generate for display a prompt to the user comprising a selectable option. For example, the media guidance application may generate for display a selectable option (e.g., on the user's television), where the selectable option, if selected, causes the media guidance application to provide means with which the Kings game can be accessed, even though the Kings' game is not stored in memory.

In some embodiments, the media guidance application, in response to receiving a selection of the selectable option, may access a replay database comprising the time-shifted version of the media asset corresponding to the element. For example, the media guidance application may access a database of recordings located in some directory that the media provider has curated (e.g., a cable provider's remote database of time-shifted sporting events).

In some embodiments, the media guidance application may retrieve the time-shifted version of the media asset corresponding to the element from the replay database. For example, the media guidance application may locate and retrieve a time-shifted version of the Kings' Stanley cup game from a cable provider's remote database.

In some embodiments, the media guidance application may generate for display the time-shifted version of the media asset corresponding to the element. For example, the media guidance application may generate for display the Kings' Stanley cup time-shifted version of the game on the television.

In some embodiments, the media guidance application may determine that the competitor was eliminated from the tournament-style competition at a certain level. For example, the media guidance application may determine that the user's favorite team in the College Football Playoff, which is a tournament where collegiate football teams compete for a national championship, University of Washington, loses a game at a semifinal, or penultimate, level.

In some embodiments, the media guidance application may compare the certain level to the level of the tournament-style competition corresponding to the progress of the user. For example, the media guidance application may identify Washington lost in the semifinals of the college football playoffs. Additionally, the media guidance application may determine the user, associated with profile information designating Washington as his or her competitor of interest, viewed Washington in their semifinal loss competition.

In some embodiments, the media guidance application may determine, based on the comparing of the certain level to the level of the tournament-style competition corresponding to the progress of the user, whether the certain level equals or exceeds the level of the tournament-style competition corresponding to the progress of the user. For example, the media guidance application may identify, as previously described, the round in which Washington lost, which was the semifinal round. Then the media guidance application may determine, through comparison of the competitor progress level and the user viewing level, that the user has viewed the game in which Washington was eliminated from competition.

In some embodiments, in responding to the determination that the certain level equals or exceeds the level of the tournament-style competition, the media guidance application generates for display the results display of the tournament-style competition further comprising refraining from blacking out any levels corresponding to the competitor that are above the level of the tournament-style competition corresponding to the progress of the user. For example, as previously described, the media guidance application has determined the user has viewed Washington's elimination game in the semifinal level, which further indicates that the subsequent rounds of competition cannot be spoiled as it relates to the progress of Washington.

In some embodiments, the media guidance application may generate for display the results display of the tournament-style competition based on the user's profile information once the media guidance application receives user input from a dedicated toggle button on a remote-control device. For example, the media guidance application may receive a request from a user who pressed a designated tournament bracket display button on a remote that, when pressed, displays the bracket for a tournament-style competition, such as a March Madness basketball bracket.

In some embodiments, the media guidance application may, in response to receiving the user input, generate for display the results display of the tournament-style competition. For example, the media guidance application may receive the user's request from pressing the dedicated results button on a remote control, and may responsively display a March Madness results display (e.g., bracket) on the television.

In some embodiments, the media guidance application may receive an additional user input from the remote-control device. For example, the media guidance application may receive input from a user who strikes the designated display button on the remote an additional time.

In some embodiments, the media guidance application may, in response to receiving the additional user input, cease to generate for display the results display of the tournament-style competition. For example, the media guidance application may receive the additional press of the dedicated results display button on the remote control, and may responsively stop displaying the bracket on the television.

There may be circumstances where the user may want to knowingly spoil tournament results because the user may want to watch a later round matchup without viewing the earlier rounds. In some embodiments, the media guidance application may receive a selection of the selectable option designated to remove any blackout markers from the results display. For example, the media guidance application may receive a request from a user whose profile information indicates an interest in the Gonzaga basketball team during March Madness to intentionally remove the presence of blackout markers present in the results display bracket on a television.

In some embodiments, the media guidance application may, in response to receiving the selection, remove the blacking out of any levels corresponding to the competitor that are above the level of the tournament-style competition corresponding to the progress of the user. For example, the user may have viewed only the first level Gonzaga March Madness competition. The media guidance application may then receive user input to display the championship round game. Since the user is voluntarily requesting to spoil the intermediate games, the media guidance application may remove the blackout of all intermediate games.

The media guidance application may receive a request from a user to generate for display a results display for a tournament-style competition. For example, the media guidance application may receive a request from a user to generate for display the results display of a tournament competition, such as the March Madness tournament previously mentioned.

The media guidance application may, in response to receiving the request, determine, from profile information corresponding to the user, a competitor of the tournament-style competition that the user prefers. For example, the media guidance application may receive a request to generate for display the March Madness competition. The media guidance application may then access a database with user profile information and retrieve user-specific competitor preferences, such as the aforementioned Gonzaga basketball team.

The media guidance application may determine a progress of the user through time-shifted versions of media assets that portray the competitor competing in the tournament-style competition. For example, the media guidance application may determine the user viewed a first level of Gonzaga competition. The media guidance application may determine a level of the tournament-style competition corresponding to the progress of the user. For example, the media guidance application may determine the user has viewed the first level of Gonzaga competition but determines the user's progress is all levels up to and not including level two.

The media guidance application may generate for display the results display of the tournament-style competition, the results display blacking out any levels corresponding to the competitor that are above the level of the tournament-style competition corresponding to the progress of the user. For example, the media guidance application may determine Gonzaga is in the third level of competition. The media guidance application may black out levels three and beyond of tournament competition to avoid spoiling outcomes for the user.

It should be noted that the systems and/or methods described above may be applied to, or used in accordance with other systems, methods, and/or apparatuses in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 2 and 3 show illustrative examples of display screens generated by a media guidance application in accordance with some embodiments of the disclosure;

FIG. 8 shows a flowchart of an illustrative process for displaying levels of competition in a tournament that correspond to user progress without spoiling outcomes in accordance with some embodiments of the disclosure;

FIG. 10 shows a flowchart of an illustrative process for generating for display the results of the competition with levels beyond the first level blacked out in accordance with some embodiments of the disclosure;

FIG. 11 shows a flowchart of an illustrative process for generating a prompt for user permission to search various directories of time-shifted media assets in accordance with some embodiments of the disclosure;

FIG. 12 shows a flowchart of an illustrative process for determining the viewing progress of the user in accordance with some embodiments of the disclosure; and FIG. 13 shows a flowchart of an illustrative process for generating for display a results display for blacking out spoiler information in accordance with some embodiments of the disclosure.

DETAILED DESCRIPTION

Figure 1:
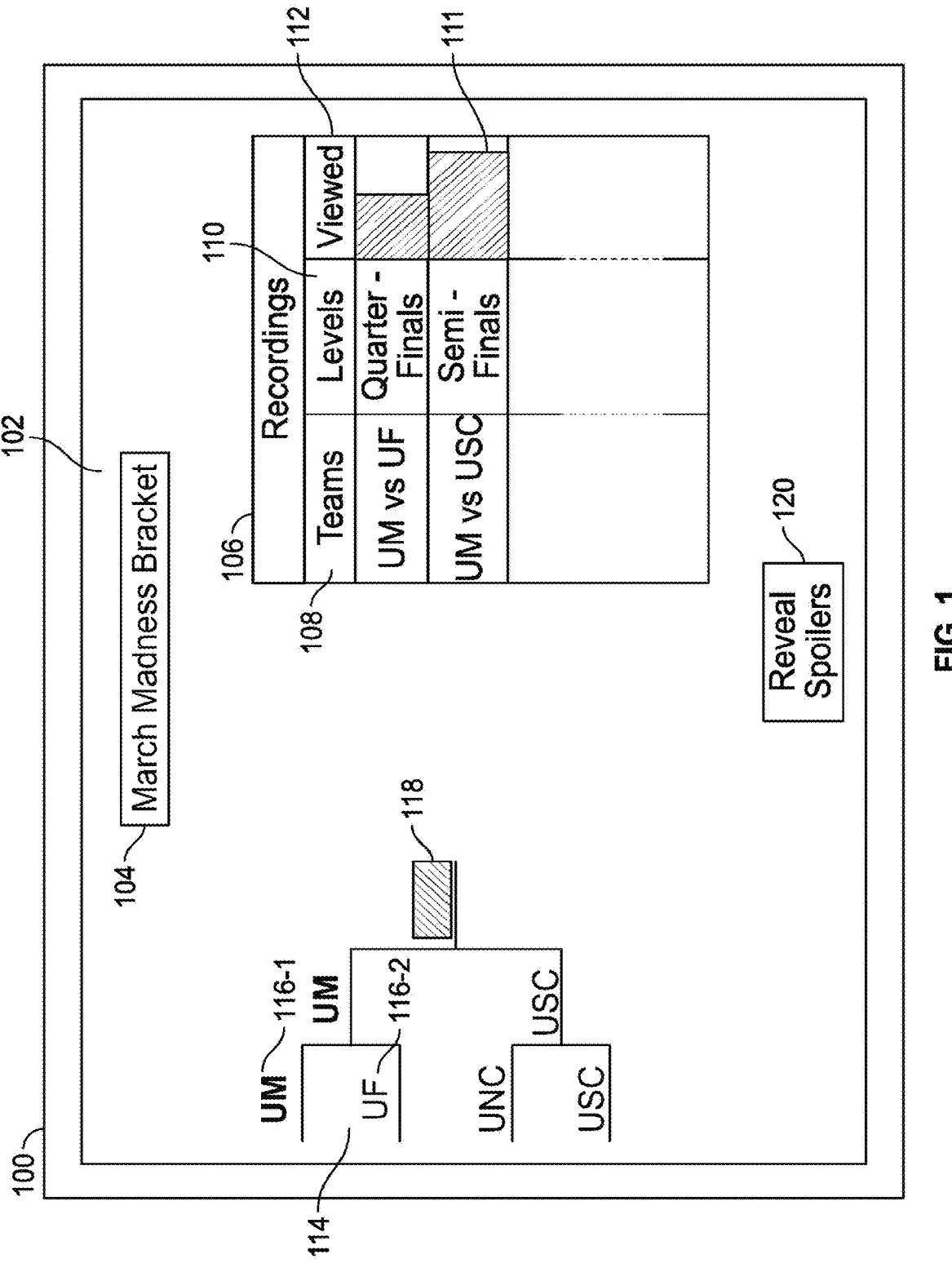
FIG. 1 shows an illustrative example of a results display for a tournament-style competition generated for display by a media guidance application, in accordance with some embodiments of the disclosure.

FIG. 1 shows an illustrative example of a results display for a tournament-style competition generated for display by a media guidance application, in accordance with some embodiments of the disclosure. FIG. 1 shows illustrative user equipment 100, which operates control circuitry that executes a media guidance application. Details relating to user equipment 100, control circuitry, and the media guidance application are described in further detail below with respect to FIGS. 2-5.

As depicted in FIG. 1, the media guidance application generates for display results display 102 (e.g., to be displayed by a display of user equipment 100). Results display 102 depicts the results of a tournament-style competition. As used herein, a "tournament-style competition" (also referred to interchangeably herein as "bracket" or "tournament") is defined as a series of contests between a number of competitors including multiple levels of competition, where competitors are eliminated from the competition at each level. For example, a tournament-style competition may be a single elimination tournament where competitors are eliminated from further competition if they lose at any level. An additional tournament example may be a round-robin competition where each competitor meets all other competitors in turn. Elimination tournaments can also have series competitions during each level. For example, two competitors may play a best 3, 5, or 7 series, meaning a competitor may have to win 2, 3, or 4 games in the series, respectively, to determine which team advances to the next level of competition. The term "competitor," as used herein, refers to a person or team who participates in a tournament-style competition. The term "level," as used herein, refers to a stage of a tournament where at least one competitor must be eliminated. For example, a level of competition can be designated by numerical descriptors, such as first, second, third, etc. Additionally, a level may be designated with a descriptor that indicates a relationship to the final level of competition, i.e., quarterfinal, semifinal, final, etc.

The media guidance application may include within results display 102 a header 104 that indicates information relating to the tournament-style competition (e.g., title of the competition, current level being played, information about one or more competitors, and the like). The media guidance application may also generate for display within or adjacent to results display 102 recordings menu 106. The term "recordings" in relation to "recordings menu 106," and as otherwise used in this disclosure, is used merely for convenience, and refers to any form of time-shifted content, including but not limited to downloaded content, content accessible by way of a remote server, on-demand content, over-the-top content (described further below with respect to FIGS. 2-5), or any other type of time-shifted media asset. The media guidance application may include within recordings menu 106 any media asset relating to the tournament-style competition that the user caused to be time-shifted, or caused to be added to a directory associated with the user. Recordings menu 106 may include any form of media asset, including full games featuring any number of competitors, or partial games (e.g., a highlight reel of big plays involving any number of competitors). The media guidance application may time-shift media assets, or may otherwise cause media assets to be indicated in recordings list 106, based on information determined from a user profile associated with the user, such as a favorite team associated with the user as indicated by the user's profile.

As depicted in FIG. 1, recordings list 106 optionally includes competitors column 108, which designates the competitors in a certain contest, and level column 110, which designates a level associated with a given time-shifted media asset indicated by recordings list 106 of the game (e.g., quarterfinals, semifinals, or finals) in the tournament-style competition. Recordings list 106 may also include column 112, which may designate the viewing progress of the user. Column 112 also includes progress meter 111, which designates the viewing progress of the user. As defined herein, "progress of the user" (also referred to as "user progress") is defined to correspond to the number levels of a competition a user has viewed. For example, a user may view some or all levels of a competition, and the user progress corresponds to this amount of completion. Additionally, user progress may refer to partial viewing of a media asset, which may be represented as 50% on progress meter 111. For example, a user may only watch 50% of a game and not view the competition to completion. Additionally, a user may watch 95% of a game corresponding to a competition but stop viewing before the end of the game. A calculation of the user progress may factor in such partial viewing of a game, as will be explained in further detail below.

The media guidance application may generate for display within results display 102 tournament bracket 114. As used herein, "bracket" is a term of convenience that may designate any form of illustrating results of a tournament-style competition (e.g., lists of what teams advanced, round robin depictions, series tournament depictions, etc.). The media guidance application may generate a printable version of the tournament bracket and may signal to a remote printing device to produce a paper copy of the printable version of the tournament. Additionally, the media guidance application may generate for display the tournament bracket on a tablet device. In an additional example, the media guidance application may generate for display the tournament bracket on a user's phone device display through a designated application. For an additional example, the media guidance application may verbally transmit the tournament bracket contents by broadcasting the competitors and levels of each competition by using a voice controlled speaker's speech capabilities. The media guidance application may depict competitors in element(s) 116-1 and element(s) 116-2. Element 116-1 is bolded to represent a preferred competitor of the user. The media guidance application may generate for display bracket 114 and a marker 118 which may black out a round of competition. As used herein, the term "black out" (also referred to in alternate form herein as "blacking out") is defined to mean a result of the media guidance application overlaying or otherwise obstructing a user from viewing some or all information within an element 116. For example, the media guidance application may leave the competitor designations blank in order to black out the result. Additionally, the media guidance application may apply a distortion to the competitor designations in order to black out the result. The distortion referenced above is a technique used to pixelate or make a competitor unrecognizable by warping the visual depiction of the competitor's name.

The media guidance application may generate for display a designated spoiler button 120, where if a selection is detected by the media guidance application, the media guidance application may remove blackout marker 118. As used herein, "spoiler" (also referred to herein as "spoil") is used to describe a situation in which the user discovers the outcome of unwatched competitions before the user intended.

In some embodiments, a media guidance application (e.g., executed by control circuitry of user equipment or of a server remote from user equipment) may receive a request to generate for display results display 102 for the tournament-style competition. Functionality of control circuitry, user equipment, servers, and communications networks are described in further detail below with respect to FIGS. 2-5. For example, the media guidance application may receive a request a variety of ways, including user input, preset controls in a user profile, or applications sending signals to the media guidance application. The media guidance application may also receive a voice command that requests to generate for display results display 102 for the March Madness basketball tournament. The media guidance application may additionally receive a preset user-defined profile request to generate for display results display 102 of March Madness.

The media guidance application may, in response to receiving the request to generate for display the results display, retrieve, from a database, profile information corresponding to the user that corresponds to competitors in the tournament-style competition. For example, the media guidance application may receive a user selection to directly access the user's profile. In an additional example, the media guidance application may prompt the user to sign in to a unique account protected by a username and password. Furthermore, in a different example, the media guidance application may utilize facial recognition technology to identify a user and his or her user profile. Also, in another example, the media guidance application may analyze viewing data for all users at a given viewing location. Furthermore, the media guidance application may identify a certain viewing pattern that corresponds to a specific user and access that user's profile information. In an additional example, the media guidance application may access databases from various locations. For example, the media guidance application may access a local database of profile information stored on a hard drive or similar storage device. Additionally, for example, the media guidance application may remotely access a subscription-based service's database of user profile information. Furthermore, in another example, the media guidance application may access a hybrid database with local user profile information and remotely accessible user profile information. For example, a media guidance application may receive a request to access a family account located in the database of the family's cable provider. Furthermore, the media guidance application may request the user to log in with a username and password. The media guidance application may determine from the username and password the father has requested access to his user profile.

In some embodiments, the media guidance application may access a database with multiple user profiles (e.g., a family of four with a husband, wife, daughter and son). Thus, for example, the media guidance application may retrieve additional profile information corresponding to an additional user. For example, the media guidance application may use facial recognition, as mentioned previously, to detect a second user viewing the television. The media guidance application may determine that the daughter is the second user.

In some embodiments, the media guidance application may determine from the profile information of the father or daughter, the competitor. As described previously, the media guidance application may receive requests from users who are seeking tournament data for a specific competitor. Furthermore, the media guidance application may access the father's user profile and retrieve competitor information for a basketball team, Gonzaga University, who is competing in the March Madness tournament. In an additional example and in the same manner as that described for the father, the media guidance application may retrieve the daughter's profile information and identify the University of California, Los Angeles (UCLA) as her preferred competitor in the March Madness competition.

In some embodiments, the media guidance application may retrieve directory information from a directory associated with the user, the directory being for time-shifted versions of media assets that the user has access to. As used herein, "directory" refers to a file system structure that contains stored data. For example, the media guidance application may access a user profile and retrieve information on a directory (e.g., DVR recordings, cloud DVR recordings, or subscription-based services with remotely accessible recordings) of time-shifted assets. The media guidance application may then retrieve the directory of time-shifted versions of the media assets, March Madness games in this case. Once the directory has been retrieved, the media guidance application may access the information regarding the time-shifted March Madness media assets stored within the directory.

In some embodiments, the media guidance application may determine, from the directory information, whether time-shifted versions of media assets that portray the tournament-style competition are indicated by the directory information. For example, the media guidance application may initiate a processing algorithm to analyze the data in a given directory to determine specific characteristics based on parameters found in the user profile. For example, the media guidance application may search the database of media-shifted assets, using March Madness as a search parameter, to identify stored March Madness competition time-shifted media assets. Additionally, for example, the media guidance application may parse through the directory of recorded shows, games, movies, etc., using the search parameter-based processing algorithm, to determine March Madness games located in the directory and exclude all other extraneous media assets outside the scope of the search parameter.

In some embodiments, the media guidance application may, in response to determining that the time-shifted versions of the media assets that portray the tournament-style competition are indicated by the directory information, determine whether, of the time-shifted versions of the media assets that portray the tournament-style competition, any media assets portray the competitor. For example, the media guidance application may parse through the directory to determine recorded March Madness games, as previously described. The media guidance application may then isolate the retrieved March Madness media assets and again apply a processing algorithm with limiting search parameters. Furthermore, as referenced previously, the media guidance application may have received a request from a user, e.g., the father requests to view Gonzaga basketball games, to view a certain team. Additionally, the media guidance application may process the March Madness media assets previously retrieved from the directory with the search parameter of Gonzaga University basketball. Then, the media guidance application may identify March Madness time-shifted media assets specifically depicting Gonzaga basketball games.

In some embodiments, the media guidance application may, in response to determining that, of the time-shifted versions of the media assets that portray the tournament-style competition, there are media assets that portray the competitor, determine the progress of the user through the media assets that portray the competitor. For example, the media guidance application may retrieve a decision rule from a user profile. Examples of decision rules based on competitions is described in Gupta et al., U.S. patent application Ser. No. 15/236,132, the disclosure of which is hereby incorporated by reference herein in its entirety. As previously described, the media guidance application may parse through a given database and determine time-shifted media assets for a certain user, which in the case of the father is time-shifted versions of Gonzaga basketball games. The media guidance application may also retrieve the viewing data stored in the database of media-shifted assets that contains, among other items, how long each user has viewed a given media asset. In the case of a family with multiple profiles in the system, the media guidance application may keep a log of viewing times of each media asset for each user. The media guidance application may retrieve this sub-category of viewing information to determine how many games and how much of each game the user has viewed (the viewer in this case being the father, who prefers Gonzaga).

In some embodiments, the media guidance application may determine a level of the tournament-style competition corresponding to the progress of the user. For example, in order to encompass various progress scenarios, the media guidance application may prompt the user to provide a competition rule. The media guidance application may receive a competition rule from the user (e.g., 50% percent viewing or more constitutes watching a complete game, a game with a score differential of 20 points with ten minutes left in the competition signifies a game with an insurmountable deficit for the losing team and thus represents a fully viewed game, etc.). The media guidance application may then perform a comparative analysis by accessing the viewing data from each individual game and comparing that data to the competition rule. The media guidance application may determine that if the viewing data satisfies the competition rule, then the media guidance application may update the viewership data to depict a completely viewed competition by the user. Furthermore, based on the request from the user, the media guidance application may need to extend the analysis of viewing progress of the competitions into viewing progress of the user in the entire tournament. Thus, the media guidance application may retrieve tournament data, which includes the type of tournament (e.g., single elimination, round robin), how many levels of the tournament, and the competitor match ups in the tournament. As seen in FIG. 1, the competitors in element(s) 116-1 and element(s) 116-2 may depict matchups that include the user's competitor of interest, which in this case is Gonzaga. The media guidance application may determine through the comparative analysis that the user has viewed two full Gonzaga games, meaning the user has viewed Gonzaga competitions through level 2.

The media guidance application may generate for display results display 102 of the tournament-style competition, results display 102 blacking out any levels corresponding to the competitor that are above the level of the tournament-style competition corresponding to the progress of the user. For example, as previously described, the media guidance application may use comparative analysis techniques and decision rules to determine the tournament level through which the user, such as the father, who likes Gonzaga, has viewed. The media guidance application may retrieve the user's tournament viewing progress to black out games that may spoil the team of interest's progress. In the case of the father, who likes Gonzaga, the media guidance application may determine the viewing progress as complete viewing through level 2 of the tournament, meaning the father has viewed two levels of Gonzaga games. In order to prevent spoilers, the media guidance application may conduct a new comparative analysis between the level of progress of the competitor, Gonzaga, and the level of viewing progress of the user, the father. The media guidance application may retrieve competitor progress information from a database linked to the user profile. The media guidance application may parse through the competitor progress data and perform a specific search for all March Madness games featuring Gonzaga using a keyword-based parameter. The media guidance application may then identify the amount of tournament wins Gonzaga has. Furthermore, the media guidance application may equate tournament wins to the corresponding level of competition of Gonzaga. The media guidance application may determine Gonzaga reached the fourth level of competition. The media guidance application may compare Gonzaga's fourth level progress to the previously described father's second round viewing progress. In order to prevent spoiling Gonzaga's progress beyond the second level, the media guidance application may black out the third and fourth level match up designations in results display 102, specifically in bracket 114. The media guidance application may then use marker 118 to black out the third and fourth level matchups of Gonzaga's competitions. Additionally, in an additional example, the media guidance application may retrieve user preferences stored in the user profile that indicate user blackout preferences. For example, the media guidance application may retrieve information from the user profile that indicates the user wants to black out only semifinal and final-round spoilers. The media guidance application will adjust accordingly and black out only results for semifinal and final matchups.

In some embodiments, the media guidance application may determine progress of an additional user through time-shifted versions of media assets that portray the additional competitor competing in the tournament-style competition, wherein generating for display the results display of the tournament-style competition further comprises blacking out results relating to the additional competitor that go beyond the progress of the additional user. For example, the media guidance application may recognize an additional user through technology such as facial recognition. The media guidance application may determine the second user to be the daughter, as described previously, whose favorite team is UCLA. The media guidance application may follow the same routine as described previously to use marker 118 to black out UCLA games beyond the level of the daughter's viewing progress, based on the daughter's blackout preferences in the user profile.

In some embodiments, the media guidance application may determine whether an additional user has a line of sight to the results display, which may alter results display 102 to prevent spoilers for all users present. As used herein, "line of sight" refers to a path of vision from a viewer to user equipment 100. For example, the media guidance application may have visual recognition capabilities that identify users at a certain television. The media guidance application may have functionality that runs a background facial recognition software that constantly scans the room for any possible users in the viewing area. The media guidance application may run an image processing algorithm, comparing the facial scanning results from the room with a user profile image database. The media guidance application may identify, through that comparison, which user from the family's stored user profile is viewing the television. Furthermore, the media guidance application may run a diagnostic timer to monitor elapsed user viewing time, to ensure the user is interested in viewing the March Madness content and not just passing through the room temporarily. Additionally, the media guidance application may track when the user count in the viewing area changes, if, for example, a user leaves the viewing area.

In some embodiments, the media guidance application may, in response to determining that the additional user has a line of sight to the results display, determine an identity of the additional user. For example, the media guidance application may generate for display a display that corresponds to only one user, the father, who likes Gonzaga. The media guidance application may analyze the room with facial recognition technology and identify a second user. Furthermore, the media guidance application may associate the scanned facial image of the second image with a facial image found in the user profile directory. The media guidance application may determine the second user is the daughter in the family and may access her profile, as previously described.

In some embodiments, the media guidance application may identify, from the additional profile information, an additional competitor, the additional competitor being of interest to the additional user. For example, the media guidance application may identify UCLA as the daughter's competitor in March Madness from her user profile, as previously described.

In some embodiments, the media guidance application may, in a different circumstance than identifying additional users, generate for display results display 102 of the tournament-style competition, further comprising visually distinguishing elements 116-1 on the results display that correspond to the subset from all other elements on the results display. As referred to herein, "visually distinguished" is an element in the bracket 114 that is somehow modified to differentiate that element, as seen in element 116-1. For example, the media guidance application may receive login confirmation from a user profile login linked to the father's user profile. The media guidance application may parse through the user profile to determine the father's team of interest in the March Madness competition, Gonzaga. The media guidance application may showcase the Gonzaga matchups found in results display 102, based on user preference. The media guidance application may showcase the particular competitions displayed in bracket 114 using various techniques, as depicted in element 116-1 (e.g., highlighting the team of interest's name designation, using contrasting coloring when displaying the team's name, etc.).

In some embodiments, the media guidance application may receive a selection from the user of an element of the visually distinguished elements from the results display. The media guidance application may receive a request from a user, emanating from a variety of sources (e.g., a phone application, a remote-control device, etc.) to view a competition that is visually distinguished in results display 102. The media guidance application may also recognize the user as the father, whose favorite team is Gonzaga.

In some embodiments, the media guidance application may, in response to receiving the selection, determine, from the directory information, a location at which a media asset corresponding to the element is stored in memory. For example, the media guidance application may process the selection of a user wanting to access the directory of stored time-shifted media assets depicting Gonzaga basketball in March Madness associated with a user profile, as described previously, to find the selected competition.

In some embodiments, the media guidance application may retrieve the media asset corresponding to the element from the location. For example, the media guidance application may retrieve Gonzaga's game from memory. The media guidance application may retrieve the time-shifted Gonzaga game using methods previously described in the specification.

In some embodiments, the media guidance application may generate for display the media asset corresponding to the element. For example, the media guidance application may generate for display Gonzaga's game on a display coupled to user equipment 100.

In some embodiments, the media guidance application may receive a selection from the user of an element that is not visually distinguished from the results display. For example, the media guidance application may receive user input to watch a game of a participant whose team name is not visually distinguished. For example, the media guidance application may, for a variety of reasons (e.g., user viewing history trends, physical location of user as it relates to regional competitors, etc.), recognize user behavior suggesting the user may have peripheral interests in teams other than the one listed in the user profile and may automatically add those potential additional teams to the profile. The media guidance application presents results display 102 based on the father's profile information, because the father previously signed in to his user profile, meaning Gonzaga games will be visually distinguished. The media guidance application may receive a request to view the Kent State University first level basketball game in March Madness, since the father was interested in seeing Kent State play because he was born in Kent, Ohio, even though Kent State is not the competitor stored in the father's user profile and the team's name is not visually distinguished in bracket 114.

In some embodiments, the media guidance application may determine, from the directory information, whether a time-shifted version of a media asset corresponding to the element was stored to memory associated with the user. For example, the media guidance application may access the directory information of recorded media assets, as previously described. In this case, however, the media guidance application may use a different search parameter to locate Kent State's first-round game. The media guidance application may use the Kent State search parameter to parse through all time-shifted media assets depicting March Madness games. The media guidance application may then make a determination whether the first level Kent State basketball game is available. The media guidance application may need to source other directories in order to locate the Kent State game. These other directory options may be stored in various ways that have been described previously in the specification.

In some embodiments, the media guidance application may, in response to determining that the time-shifted version of the media asset corresponding to the element was stored to memory associated with the user, determine, from the directory information, a location at which a media asset corresponding to the element is stored in the memory. For example, the media guidance application may identify the Kent State game somewhere in memory as previously described when discussing retrieval of Gonzaga basketball games.

In some embodiments, the media guidance application may retrieve the media asset corresponding to the element from the location. For example, the media guidance application may retrieve the Kent State game from memory as previously described in the specification as it relates to retrieving Gonzaga March Madness games.

In some embodiments, the media guidance application may generate for display the media asset corresponding to the element. For example, the media guidance application may display the Kent State game on user equipment 100, as previously described.

In some embodiments, the media guidance application may generate for display a prompt to the user comprising a selectable option. As used herein, "selectable option" is a prompt or prompts that give the user options on how to proceed through situations. The media guidance application may display a prompt for a variety of reasons (e.g., the media guidance application may be unable to locate the requested media asset in the profile linked to the user profile, the user may have inputted an unrecognizable request, the media guidance application may need more specific keywords in order to find the requested media asset, etc.). For example, the media guidance application may receive a request from a user, such as the father who likes Gonzaga basketball, for a Gonzaga second level March Madness basketball game. The media guidance application may use the same process as described previously to search for the requested game in the directory associated with the user profile. In some circumstances, the media guidance application may not locate and retrieve the desired media asset for the second level Gonzaga game. As a result, the media guidance application may generate for display a prompt asking if the user would like to retrieve the media asset from another database.

In some embodiments, the media guidance application may, in response to receiving a selection of the selectable option, access a replay database comprising the time-shifted version of the media asset corresponding to the element. For example, the media guidance application may receive a selection from the user via a remote device to access additional directories in order to locate and retrieve the desired media asset, such as the second level Gonzaga game requested by the father. The media guidance application may then perform a search of sports-related databases which can be found in a variety of remote locations (cable provider remote databases, sports broadcasting network databases, etc). Furthermore, the media guidance application may use a keyword search, such as "Gonzaga," in order to parse through all databases and narrow the search field. Once the search field has been narrowed, the media guidance application may target one database with Gonzaga March Madness media assets that can grant immediate access of the media asset to the user.

In some embodiments, once the media asset has been located, the media guidance application may retrieve the time-shifted version of the media asset corresponding to the element from the replay database. For example, the media guidance application may locate Gonzaga's second level game and retrieve it from the additional database and make accessible to the user, who is the father in this case.

In some embodiments, the media guidance application may generate for display the time-shifted version of the media asset corresponding to the element. For example, the media guidance application may generate for display Gonzaga's second level game, as previously described.

In some embodiments, the media guidance application may determine that the competitor was eliminated from the tournament-style competition at a certain level. The media guidance application may perform routine evaluations of the tournament's competitors, i.e., see who has been eliminated and who advanced. The media guidance application may have access to a database of tournament data. For example, the media guidance application may periodically retrieve competitor data from a March Madness-specific database of competitor data. The media guidance application may then cross-reference the user's preferred team with the March Madness data to see if that team has been eliminated.

In some embodiments, the media guidance application may compare the certain level to the level of the tournament-style competition corresponding to the progress of the user. The media guidance application may use a similar technique, as previously described where the media guidance application may use search algorithms to parse through the user profile and identity the viewing progress of the user. The media guidance application may determine the user's viewing data, such as the father's viewing progress of Gonzaga in the tournament, and compare that viewing progress with the level in the tournament in which the competitor was eliminated.

In some embodiments, the media guidance application may determine, based on the comparing of the certain level to the level of the tournament-style competition corresponding to the progress of the user, whether the certain level equals or exceeds the level of the tournament-style competition corresponding to the progress of the user. The media guidance application may initially perform a comparison between the level of elimination of the competition and the viewing progress level of the user. The media guidance application may determine the user has viewed the elimination game if the user's viewing progress level is the same as or exceeds the level of the team's elimination. For example, the media guidance application may determine the user, the father, viewed all games up to and including level four of competition. Additionally, the media guidance application may also determine Gonzaga was defeated in the third level of competition. In this example, the media guidance application may determine the father has viewed the elimination game.

In some embodiments, the media guidance application may generate for display the results display of the tournament-style competition further comprises, in response to determining that the certain level equals or exceeds the level of the tournament-style competition corresponding to the progress of the user, refraining from blacking out any levels corresponding to the competitor that are above the level of the tournament-style competition corresponding to the progress of the user. For example, the media guidance application may determine, as previously described, the user, who is the father in this example, viewed the elimination game, which means the media guidance application can no longer spoil the team's progress in results display 102 any longer. As a result, the media guidance application may once again retrieve updated data from the directory of competitor data to determine the progress of all teams in the tournament. The media guidance application may display an updated version of bracket 114 with all teams visible without blackout marker 118.

In some embodiments, the media guidance application may generate for display the results display of the tournament-style competition based on the user's profile information once the media guidance application receives user input from a dedicated toggle button on a remote-control device. For example, the media guidance application may receive input from a designated button for user selection, such as a button on a remote; a hand gesture recognized by motion sensor; voice command recognized by a speech analyzer; a button on a mobile application; etc. The media guidance application may receive the request to generate for display the results display 102 and process the available data accordingly. The media guidance application may instantly pull the most up-to-date competitor tournament data and populate bracket 114 and subsequently update results display 102.

In some embodiments, the media guidance application may, in response to receiving the user input, generate for display the results display of the tournament-style competition. For example, the media guidance application may receive a user input from sources other than the designated toggle button. For example, the media guidance application may receive a selection from the user who is using a designated menu in the user profile that has an option to generate the results display. The media guidance application may generate for display bracket 114 in results display 102 on user equipment 100, as previously described.

In some embodiments, the media guidance application may receive an additional user input from the remote-control device for an option to inhibit generation of the results display. For example, the media guidance application may receive a user selection from a variety of sources (e.g., remote control, tournament-specific application, motion sensors, voice sensors, etc.). The media guidance application may process this request by adjusting the settings in the user profile, changing the formatting or appearance of results display 102, etc.

In some embodiments, the media guidance application may, in response to receiving the additional user input, cease to generate for display the results display of the tournament-style competition. For example, the media guidance application may receive input from the user from a variety of devices, as previously described in the specification, to stop generating for display bracket 114. The media guidance application may have functionality that places the tournament logo in the results display 102 in place of the bracket 114. The media guidance application may also have functionality that changes the pixilation of bracket 114 and prevents the user from viewing the bracket.

In some embodiments, the media guidance application may receive a selection of the selectable option related to voluntarily spoiling the results display of a tournament. For example, the media guidance application may receive a selection from the user selecting spoiler button 120, from a variety of remote devices and techniques previously described.

In some embodiments, the media guidance application may, in response to receiving the selection, remove the blacking out of any levels corresponding to the competitor that are above the level of the tournament-style competition corresponding to the progress of the user. For example, the media guidance application may process the request to remove the presence of blackout marker 118 by processing user profile data and identifying the presence of marker 118. The media guidance application may then alter the visual representation of results display 102 to be void of the presence of blackout markers 118 in bracket 114, thus spoiling the results of the tournament for the user.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. In some embodiments, display 200 may include a selectable option (not shown) to access a display of a list of scheduled recordings. For example, the media guidance application may generate for display the list of scheduled recordings that is similar to a display generated for display in response to a selection of third selectable option 128 of FIG. 1. In some embodiments, the display 110 of FIG. 1 may be generated for display over grid display 200 upon invoking the display 200, instead of over a video of a media asset. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. For example, the media guidance application may determine through monitoring content the user access, the preference hierarchy of teams that was discussed in reference to the selection of second selectable option 126 in FIG. 1. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In some embodiments, the display 110 of FIG. 1 may be generated for display over grid display 300 upon invoking the display 300, instead of over a video of a media asset. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
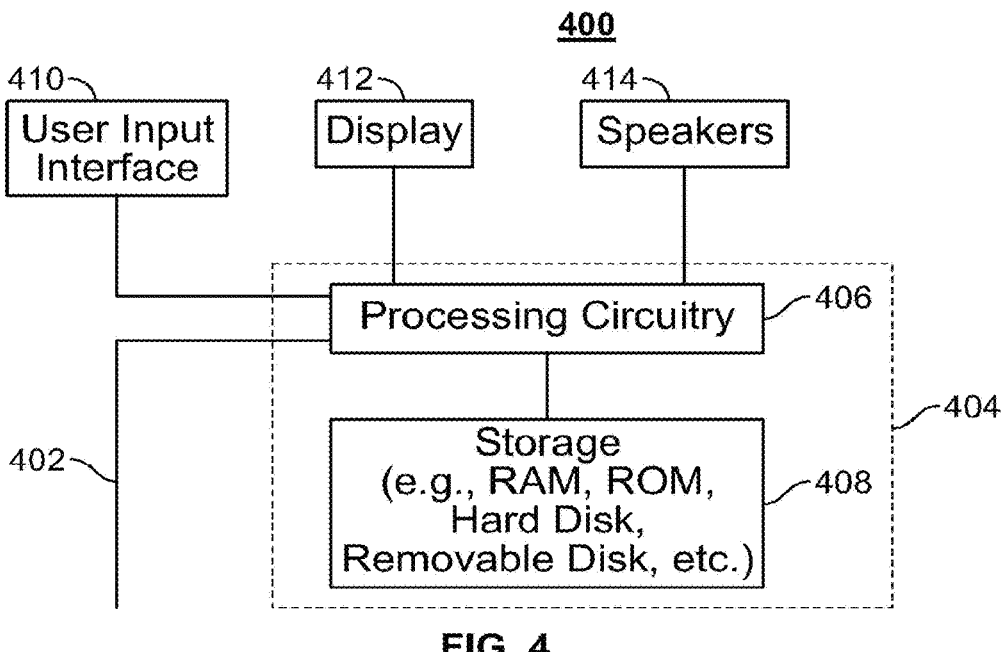
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
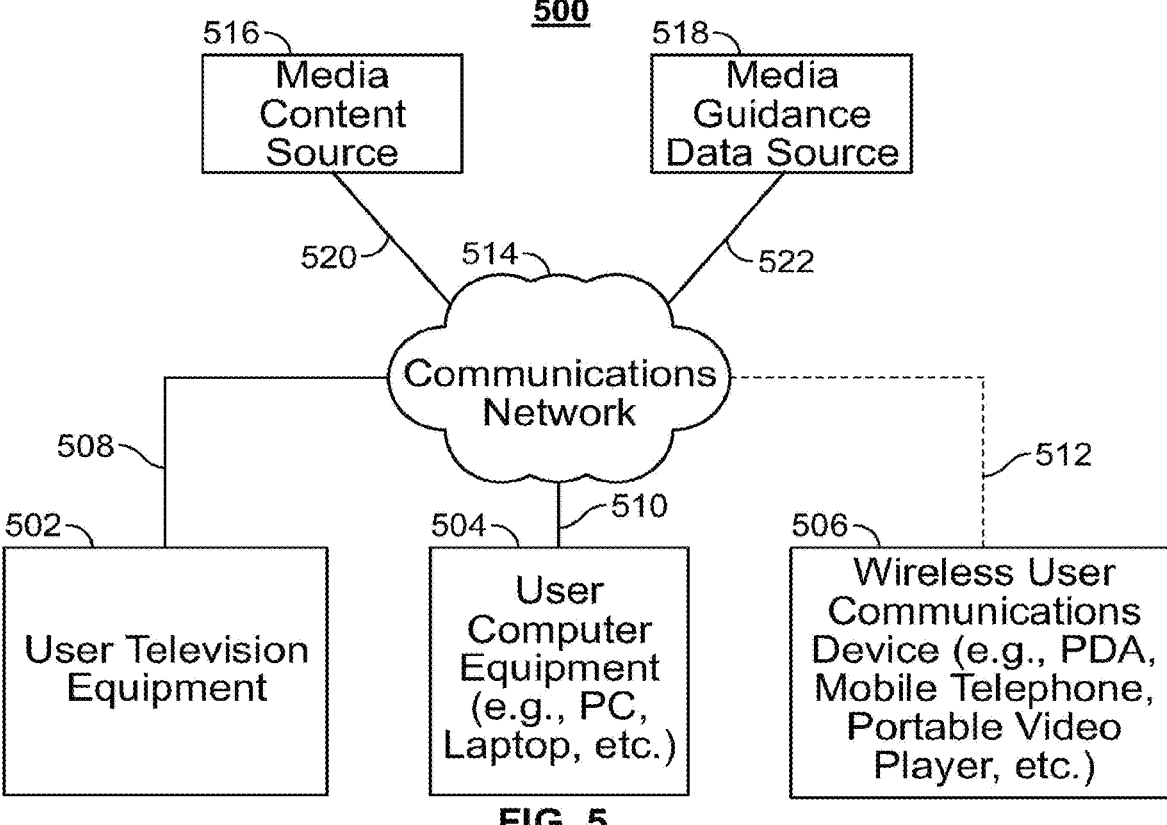
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and

518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device. In some embodiments, the OTT sources may include Internet data sources such as RSS feeds, social media sources, news sources, or other sources that are updated at a more frequent interval than conventional media guidance data. For example, the OTT sources may include a database from which blobs of data (e.g., javascript object notation (JSON) data, or any other suitable data format) for sporting events may be queried and retrieved by user equipment devices 402, 404, and 406.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4. In some embodiments, the cloud resources may include data sources such as RSS feeds, social media sources, news sources, or other sources that are updated at a more frequent interval than conventional media guidance data. For example, the cloud resources may provide data (e.g., javascript object notation (JSON) data, or any other suitable data format) for sporting events and may be queried and retrieved by user equipment devices 402, 404, and 406.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
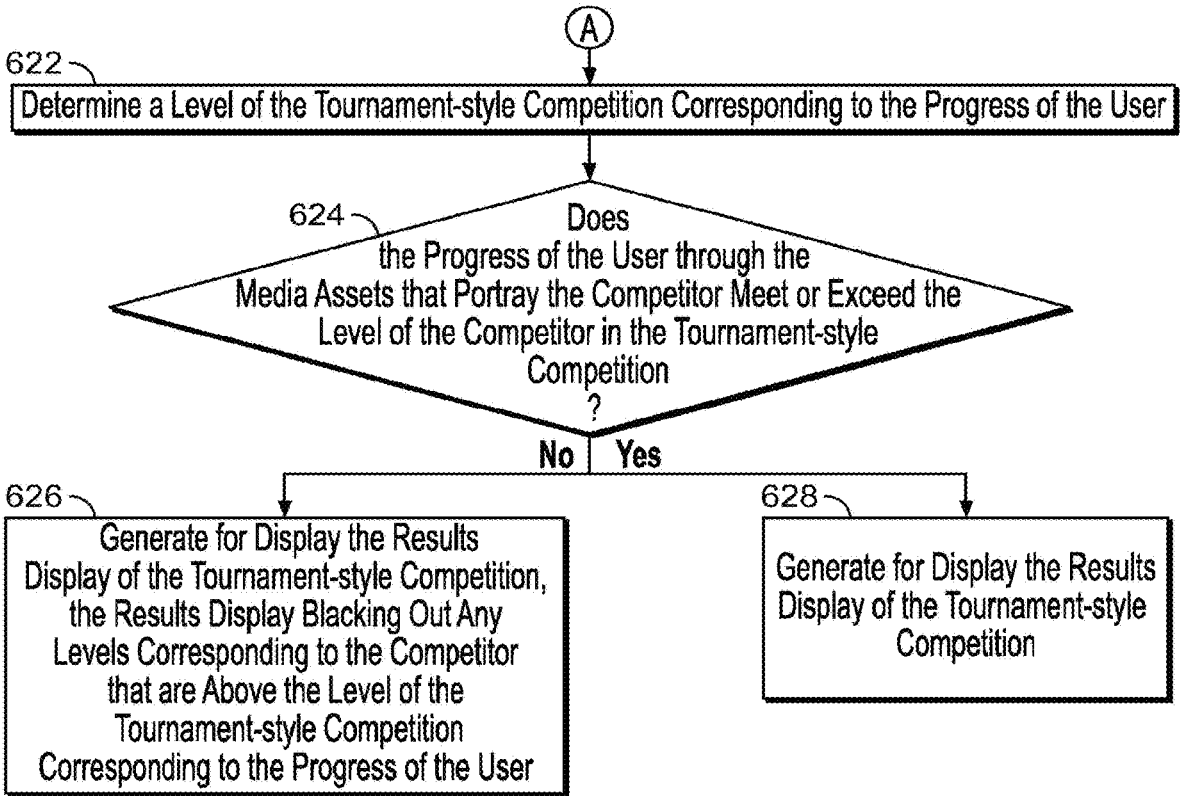
FIG. 6 shows a flowchart of an illustrative process for generating for display a results display for a tournament-style competition in accordance with some embodiments of the disclosure.

FIG. 6 is a flowchart of illustrative steps for generating for display a results display of a tournament-style competition. It should be noted that process 600 or any step thereof could be performed on, or provided by, any of the devices shown in FIGS. 4-5. For example, process 600 may be executed by a control circuitry 404 (FIG. 4) as instructed by a media guidance application implemented on user equipment 100 (which may have the functionality of any or all of user equipment 502, 504, and/or 506 (FIG. 5)) in order to generate for display the results display. In addition, one or more steps of process 600 may be incorporated into or combined with one or more steps of any other process or embodiment (e.g., as described in relation to FIGS. 8-12).

At 602, the control circuitry 404 receives a request from user input interface 410 to generate for display on display 412 results display 102 for a tournament-style competition. For example, the media guidance application may receive a request from a user to view the March Madness basketball tournament.

At 604, the control circuitry 404 retrieves, from media guidance data source 518, profile information corresponding to a user that corresponds to competitors in the tournament-style competition. For example, the media guidance application may retrieve profile information of a user who made the request to generate for display a tournament-style competition.

At 606, the control circuitry 404 determines if a competitor is included in the profile information. For example, the media guidance application may determine a competitor from the user profile. The media guidance application may determine that competitor to be the Gonzaga University basketball team.

At 608, the control circuitry 404 generates for display the results display 102 presented on display 412 of the tournament-style competition without blacking out any levels of competition. For example, the media guidance application may not determine a competitor in the user profile. The media guidance application may then generate a results display of March Madness without blacking out any competitors.

At 610, the control circuitry 404 retrieves directory information from a directory, such as memory 408 or media guidance data source 518, a directory being for time-shifted versions of media assets that the user has access to. For example, the media guidance application may access a directory designated for March Madness games.

At 612, the control circuitry 404 determines if the directory (e.g., in memory 408) includes time-shifted versions of media assets that portray the tournament-style competition. The media guidance application may determine the directory has recorded March Madness games available.

At 614, the control circuitry 404 generates for display the results display presented on display 412 of the tournament-style competition, the results display blacking out any levels beyond the first level of competition. For example, the media guidance application may generate for display the March Madness bracket, blacking out any levels beyond the first round of games.

At 616, the control circuitry 404 determines if any of the time-shifted versions of the media assets that portray the tournament-style competition, found in the directory in memory 408 or media guidance data source 518, portray the competitor. For example, the media guidance application may determine from the directory that there are recorded versions of the Gonzaga March Madness games.

At 618, the control circuitry 404 generates for display a prompt asking if the user wants to search for the competitor in media assets that are stored that were not in the user's directory. For example, the media guidance application may determine there are no available recordings of Gonzaga basketball games. For example, the media guidance application may display a prompt asking the user if the user would like to search a different directory (e.g., a third-party media directory) for the Gonzaga game.

At 620, the control circuitry 404 determines the progress (as seen in progress bars 111 in results display 102) of the user through the media assets that portray the competitor. For example, the media guidance application may access profile information (such as memory 408 or media guidance data source 518) that indicates the progress of the user through the various levels of competition. The media guidance application may determine the user has viewed a single Gonzaga game.

At 622, the control circuitry 404 determines a level of the tournament-style competition corresponding to the progress of the user, which can be seen in table 106. For example, the media guidance application may determine the user has viewed the first-round Gonzaga March Madness game.

At 624, the control circuitry 404 determines if the progress of the user through the media assets that portray the competitor meets or exceeds the level of the competitor in the tournament-style competition. For example, the media guidance application may determine Gonzaga has played in two rounds of competition. The media guidance application may also determine the user has viewed the first-round matchup. In this example, the media guidance application may determine the user progress does not meet or exceed Gonzaga's progress.

At 626, the control circuitry 404 generates for display the results display 102, presented on display 412, of the tournament-style competition, the results display blacking out any levels corresponding to the competitor that are above the level of the tournament-style competition corresponding to the progress of the user. For example, the media guidance application may determine the progress of the user does not exceed the progress of Gonzaga. The media guidance application may then generate for display the March Madness results display and black out any rounds above the level of progress of the user.

At 628, the control circuitry 404 generates for display the results display 102, presented on display 412, of the tournament-style competition. For example, the media guidance application may determine the progress of the user meets or exceeds the progress of Gonzaga. The media guidance application may then generate for display the March Madness results display.

Figure 7:
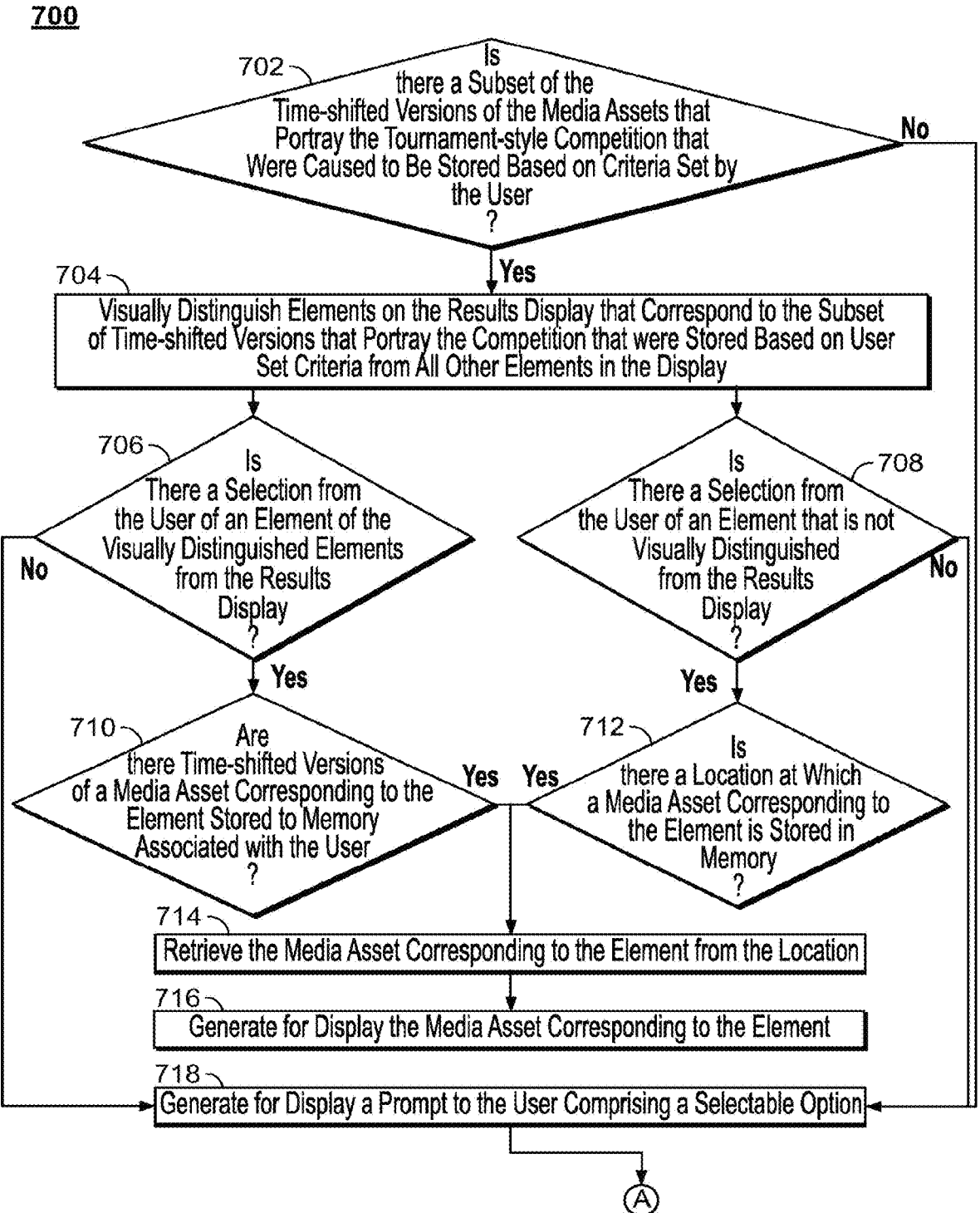
FIG. 7 shows an illustrative example of retrieving time-shifted media assets of tournament competitions in accordance with some embodiments of the disclosure.
Figure 7:
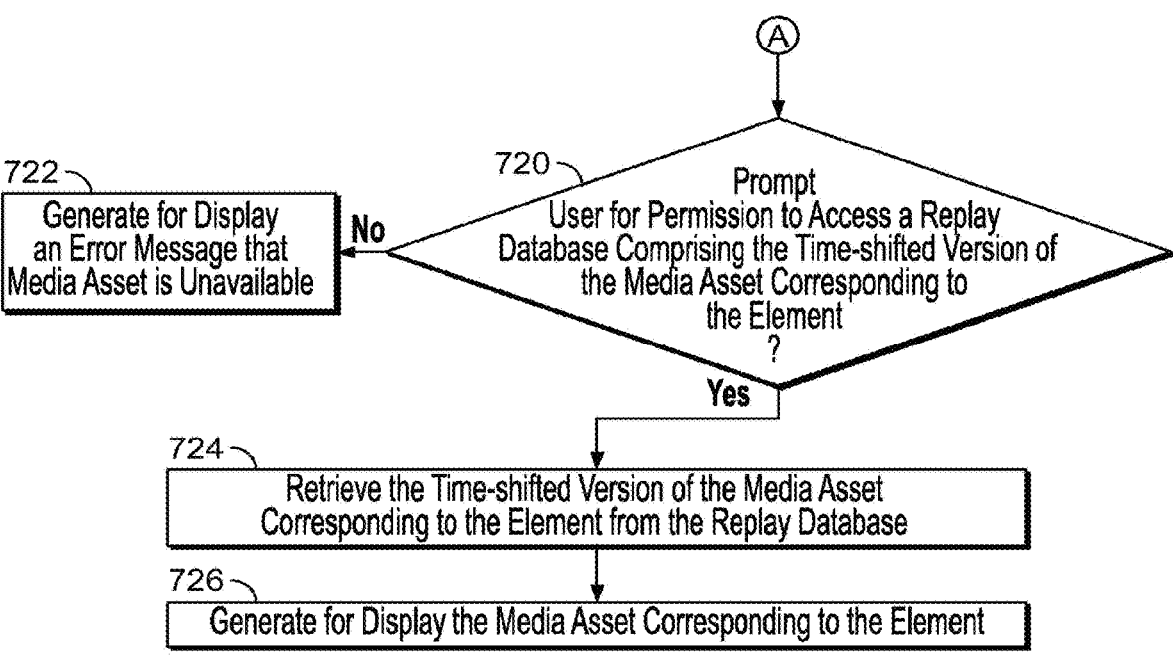

FIG. 7 is a flowchart of illustrative steps for determining a subset of time-shifted media assets depicting tournament-style competition. It should be noted that process 700 or any step thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to determine time-shifted media assets. In addition, one or more steps of process 700 may be incorporated into or combined with one or more steps of any other process or embodiment (e.g., as described in relation to FIGS. 8-12).

At 702, the control circuitry 404 determines if there is a subset of the time-shifted versions of the media assets that portray the tournament-style competition that were caused to be stored in memory 408 or media guidance data source 518 based on criteria set by the user. For example, the media guidance application may determine the March Madness games have been stored in a user storage. For example, the media guidance application may also determine there is not a subset of available time-shifted March Madness games. Additionally, the media guidance application may determine the user criteria indicates Gonzaga as the competitor.

At 704, the control circuitry 404 visually distinguishes elements on the results display 102, presented on display 412, that correspond to the subset of time-shifted versions that portray the competition that were stored in memory 408 or media guidance data source 518, based on user set criteria from all other elements in the display. For example, the media guidance application may highlight all instances of the name Gonzaga in the tournament bracket.

At 706, the control circuitry 404 receives a selection from the user from equipment 502, 504, 506 of an element of the visually distinguished elements 116-1 from results display 102. For example, the media guidance application may receive a selection of a highlighted Gonzaga game from the user.

At 708, the control circuitry 404 receives a selection from the user from equipment 502, 504, 506 of an element that is not visually distinguished, element 116-2, from results display 102. For example, the media guidance application may receive a selection of a non-highlighted competition that does not include Gonzaga.

At 710, the control circuitry 404 determines if time-shifted versions of a media asset correspond to the element stored to memory 408 or media guidance data source 518 associated with the user. For example, the media guidance application may determine if there are recorded versions of Gonzaga games stored in memory.

At 712, the control circuitry 404 determines if there is a location at which a media asset corresponds to the element is stored in local memory 408 or media content source 516. For example, the media guidance application may determine if a location exists in memory where recorded versions of Gonzaga games exist.

At 714, the control circuitry 404 retrieves the media asset corresponding to the element from the location in local memory 408 or media content source 516. For example, the media guidance application may retrieve a time-shifted recording of a Gonzaga game from a location in memory.

At 716, the control circuitry 404 generates for display the media asset on a display 412 corresponding to the element. For example, the media guidance application may generate for display the recorded version of a Gonzaga game whose name listed in the results display was selected.

At 718, the control circuitry 404 generates for display a prompt to the user on display 412 comprising a selectable option. For example, the media guidance application may determine a recorded version of the Gonzaga game does not exist in memory. For example, the media guidance application may respond by prompting the user with a selectable option.

At 720, the control circuitry 404 may decide the user wants to access media guidance data source 518 on communication network 514, with access to media content source 516 comprising the time-shifted version of the media asset corresponding to the element. The media guidance application may analyze user input from the prompted message to determine whether to search a different replay database than what is stored in memory.

At 722, the control circuitry 404 generates for display an error message on display 412 that a media asset is unavailable. The media guidance application may search a different replay database for the game and may not locate the recording. For example, the media guidance application may then generate for display an error message that the Gonzaga game is not available in the reply databases accessed.

At 724, the control circuitry 404 retrieves the time-shifted version of the media asset corresponding to the element from the replay database (such as media content source 516) from communications network 514. For example, the media guidance application may receive a user selection that the user wants the media guidance application to search other databases. For example, the media guidance application may retrieve the recording of the Gonzaga game from the other database (such as media content source 516).

At 726, the control circuitry 404 generates for display, presented on display 412 the media asset corresponding to the element. For example, the media guidance application may generate the recorded version of the Gonzaga game accessed through a different directory of recorded media assets (such as media content source 516).

FIG. 8 is a flowchart of illustrative steps for determining if a user viewed an elimination game of a competitor. It should be noted that process 800 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to determine if a user viewed an elimination game. In addition, one or more steps of process 800 may be incorporated into or combined with one or more steps of any other process or embodiment (e.g., as described in relation to FIGS. 8-12).

At 802, the control circuitry 404 determines if the competitor was eliminated from the tournament-style competition at a certain level. For example, the media guidance application may access tournament information (from media guidance source 518) and determine the Gonzaga basketball was eliminated in the third round of competition.

At 804, the control circuitry 404 compares the certain level to the level of the tournament-style competition corresponding to the progress of the user. For example, the media guidance application may determine Gonzaga lost in the third round. The media guidance application may also determine the user has watched the first-round game. The media guidance application may compare the two progress levels of the team and user, respectively.

At 806, the control circuitry 404 generates for display, presented on display 412, results display 102 of the tournament-style competition, the results display blacking out with marker 118 any levels corresponding to the competitor that are above the level of the tournament-style competition corresponding to the progress of the user. For example, the media guidance application may determine Gonzaga was not eliminated from competition. For example, the media guidance application may generate for display the March Madness results display, blacking out any level that displays Gonzaga's team name.

At 808, the control circuitry 404 determines, based on the comparing of the certain level to the level of the tournament-style competition that corresponds to the progress of the user, if the certain level equals or exceeds the level of the tournament-style competition corresponding to the progress of the user. For example, the media guidance application may determine the level of progress of the user is lower than the elimination level of Gonzaga.

At 810, the control circuitry 404 generates for display, presented on display 412, results display 102 of the tournament-style competition further comprising refraining from blacking out any levels with marker 118 corresponding to the competitor that are above the level of the tournament-style competition corresponding to the progress of the user. For example, the media guidance application may determine the user viewed Gonzaga's elimination game. For example, the media guidance application may generate for display the March Madness display without blacking out any levels of competition, because the user knows Gonzaga lost.

Figure 9:
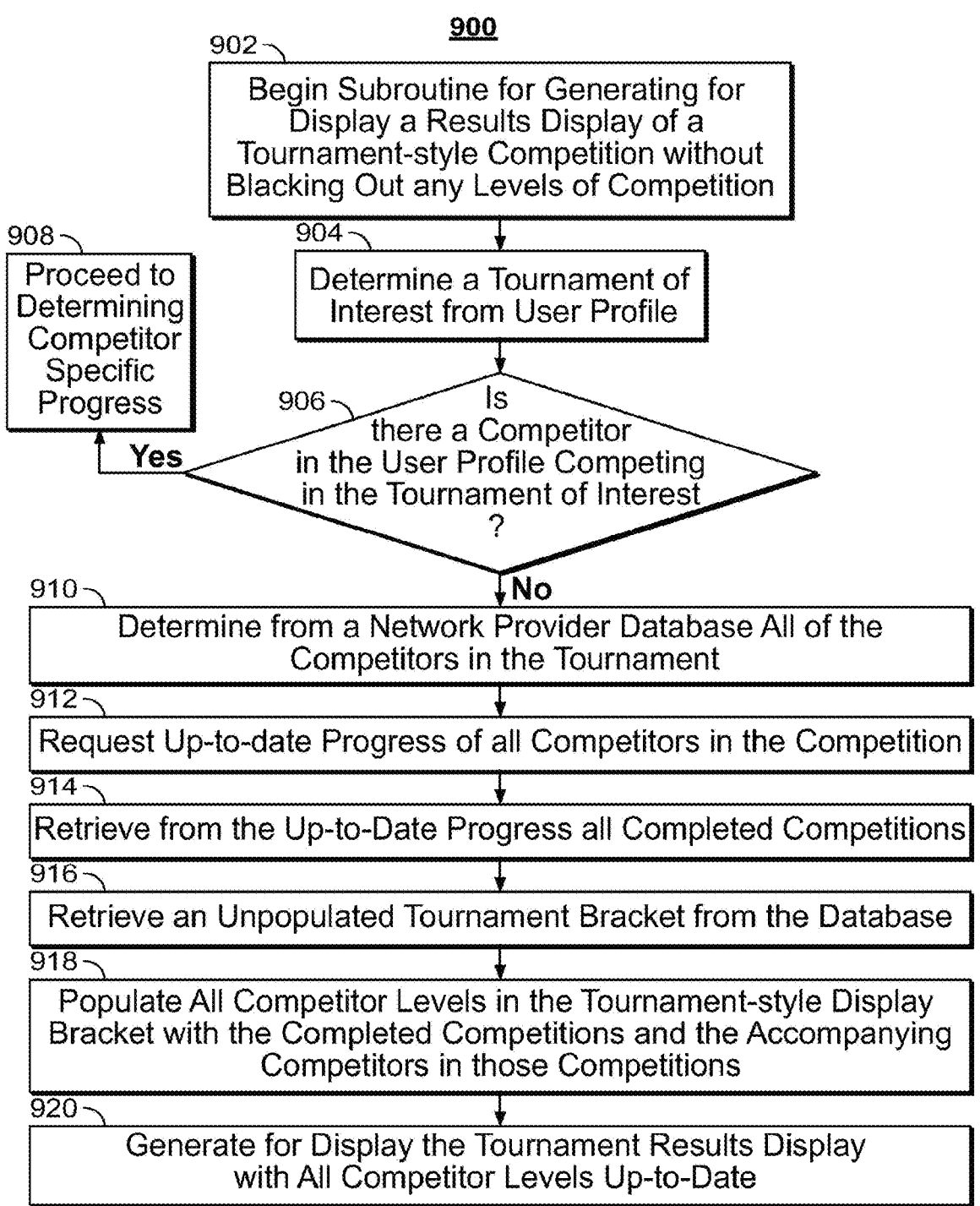
FIG. 9 shows a flowchart of an illustrative process for generating for display the results of a tournament-style competition without blacking out any levels of competition in accordance with some embodiments of the disclosure.

FIG. 9 is a flowchart of illustrative steps for generating for display non-blacked-out results display. It should be noted that process 900 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to generate for display a non-blacked-out results display. In addition, one or more steps of process 900 may be incorporated into or combined with one or more steps of any other process or embodiment (e.g., as described in relation to FIGS. 10-12).

At 902, the control circuitry 404 begins a subroutine for generating for display on display 412 results display 102 of a tournament-style competition without blacking out any levels of competition. For example, the media guidance application may initiate the process to display the March Madness display without blacking out any rounds of the tournament.

At 904, the control circuitry 404 determines a tournament of interest from a user profile stored in memory 408 or media guidance data source 518. For example, the media guidance application may determine March Madness to be of interest to the user.

At 906, the control circuitry 404 determines if a competitor is in the user profile stored in memory 408 or media guidance data source 518 competing in the tournament of interest. For example, the media guidance application may determine if the competitor indicated in the user profile is participating in March Madness.

At 908, the control circuitry 404 proceeds to determining competitor-specific progress. For example, the media guidance application may determine that Gonzaga is the competitor represented in the user profile. For example, the media guidance application may proceed, going through other processes to determine Gonzaga's progress.

At 910, the control circuitry 404 determines from a network provider on communications network 514 from media guidance data source 518 all of the competitors in the tournament. For example, the media guidance application may determine no team representation is present in the user profile. For example, the media guidance application may search a network provider database and find participants in the March Madness tournament.

At 912, the control circuitry 404 requests up-to-date progress of all competitors in the competition. For example, the media guidance application may request the current progress of the competitors in the March Madness tournament.

At 914, the control circuitry 404 retrieves from the up-to-date progress all completed competitions. For example, the media guidance application may retrieve data that indicates which games in the March Madness competition are complete.

At 916, the control circuitry 404 retrieves an unpopulated tournament bracket from the database (such as media guidance data source 518). For example, the media guidance application may retrieve the March Madness tournament bracket with no name indications at any levels of competition.

At 918, the control circuitry 404 populates all competitor levels in the tournament-style display bracket 114 in results display 102 on display 412 with the completed competitions and the accompanying competitors in those competitions. For example, the media guidance application may populate the levels of the March Madness competition with the competitor competition data retrieved in the previous step, 916.

At 920, the control circuitry 404 generates for display on display 412 the tournament results display 102 with all competitor levels up-to-date. For example, the media guidance application may generate for display the March Madness tournament results display with competitions current and up-to-date.

FIG. 10 is a flowchart of illustrative steps for generating for display a results display with levels beyond the first level blacked out with marker 118. It should be noted that process 1000 or any step thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5)) in order to generate for display a results display with all levels above the first level blacked out. In addition, one or more steps of process 900 may be incorporated into or combined with one or more steps of any other process or embodiment (e.g., as described in relation to FIGS. 11-12).

At 1001, the control circuitry 404 begins a subroutine for generating for display on display 412, results display, 102 of the tournament-style competition, the results display blacking out any levels beyond the first level of competition. For example, the media guidance application may generate for display the results display of March Madness with all levels beyond the first round blacked out.

At 1002, the control circuitry 404 determines a tournament of interest from a user profile stored in memory 408 or media guidance data source 518. For example, the media guidance application may access the user profile and determine March Madness as a user's tournament of interest.

At 1004, the control circuitry 404 determines if a user profile in memory 408 or media guidance data source 518 indicates data associated with a competitor competing in the tournament of interest. For example, the media guidance application may determine if Gonzaga is stored in the profile.

At 1006, the control circuitry 404 generates for display, on display 412, the tournament without blacking out, using marker 118, any levels of competition. For example, the media guidance application may generate for display March Madness without blacking out any competitions because no competitor was in the user profile.

At 1008, the control circuitry 404 determines from a network, from communications network 514, the provider database from media content source 516, the competitors in the tournament. For example, the media guidance application may determine the participants in March Madness by accessing a directory of teams.

At 1010, the control circuitry 404 requests up-to-date progress of competitors in the tournament. For example, the media guidance application may request the current progress of the competitors in March Madness.

At 1012, the control circuitry 404 retrieves from the up-to-date progress all completed competitions. For example, the media guidance application may retrieve the competitions in March Madness that are complete.

At 1014, the control circuitry 404 retrieves an unpopulated tournament bracket from the database media guidance data source 518. For example, the media guidance application may retrieve the unpopulated March Madness bracket from the database.

At 1016, the control circuitry 404 populates all competitor levels in the tournament-style display bracket with the completed competitions and the accompanying competitors in those competitions. The media guidance application may use the retrieved team completion data and populate the up-to-date progress of the teams in the results display bracket.

At 1018, the control circuitry 404 parses through all competition levels beyond the first level. For example, the media guidance application may search through all levels of March Madness competition.

At 1020, the control circuitry 404 creates identifiers for all competitions beyond the first level. For example, the media guidance application will parse through each level of March Madness and register a unique identifier for each level.

At 1022, the control circuitry 404 applies blackout marker 118 to all competitions with an identifier that indicates a level beyond the first level of competition. For example, the media guidance application may apply blackout marker 118 to all levels of competition in March Madness beyond the first level in the results display.

FIG. 11 is a flowchart of illustrative steps for searching directories other than the user directory for time-shifted media assets. It should be noted that process 1100 or any step thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to prompt the user to access a different directory. In addition, one or more steps of process 1100 may be incorporated into or combined with one or more steps of any other process or embodiment (e.g., as described in relation to FIG. 12).

At 1102, the control circuitry 404 begins a subroutine for generating for display on display 412 a prompt asking if the user wants to search for a competitor in media assets that are stored that were not in the user's directory in memory 408. For example, the media guidance application may generate for display a prompt for the user to choose whether the media guidance application may search other media assets for a competition.

At 1104, the control circuitry 404 displays, on display 412, a prompt, "Do you wish to search additional directories for the competition?" For example, the media guidance application may not have access to a Gonzaga game and may prompt the user for a decision to search other databases of recorded games to find the Gonzaga game.

At 1106, the control circuitry 404 determines if the user wants to access a different media asset directory (such as media guidance data source 518) from communications network 514. For example, the media guidance application may receive a request to access additional directories to find a recording of the Gonzaga game.

At 1108, the control circuitry 404 generates for display, on display 412, results display 102 of the tournament-style competition, results display 102 blacking out with marker 118 any levels beyond the first level of competition. For example, the media guidance application may not receive a request to search additional directories. For example, the media guidance application may generate for display the March Madness results display, blacking out any level beyond the first round of the tournament.

At 1110, the control circuitry 404 requests access to a network provider from communication network 514 from media content source 516 media asset directories. For example, the media guidance application may request access to the cable provider's database of recorded March Madness games.

At 1112, the control circuitry 404 retrieves a subset of network providers from communication network 514 from media content source 516 media asset directory 518 for user-requested tournament-style competition media assets. For example, the media guidance application may retrieve a subset of the cable provider's database that contains recorded March Madness games.

At 1114, the control circuitry 404 finds competitor-specific media assets in media content source 516 within the tournament-style competition media asset subset. For example, the media guidance application may find Gonzaga games in the March Madness-specific directory.

At 1116, the control circuitry 404 retrieves the media asset from media content source 516 portraying the competitor. For example, the media guidance application may retrieve the user-requested Gonzaga game from the cable provider's directory.

FIG. 12 is a flowchart of illustrative steps for determining user viewing progress in a tournament-style competition. It should be noted that process 1200 or any step thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5)) in order to determine user viewing progress in a tournament-style competition. In addition, one or more steps of process 1100 may be incorporated into or combined with one or more steps of any other process or embodiment (e.g., as described in relation to FIG. 12).

At 1202, the control circuitry 404 begins a subroutine for determining a level of the tournament-style competition corresponding to the progress of the user. For example, the media guidance application may determine the viewing progress of a viewer of March Madness content.

At 1204, the control circuitry 404 establishes a competition rule that determines whether a competition has been viewed or not. For example, the media guidance application may establish a competition rule that a user may view 75% (displayed in progress bars 111) of a total game and it will be considered viewing a March Madness game to completion.

At 1206, the control circuitry 404 accesses a user profile in memory 408 and viewing progress data from media guidance data source 518 on the competitor of interest. For example, the media guidance application may access the user profile to gather user viewing progress data.

At 1208, the control circuitry 404 evaluates user viewing progress data against the competition rule. For example, the media guidance application may compare the user March Madness viewing data gathered from the user profile against the 75% completion competition rule.

At 1210, the control circuitry 404 determines how many competitions a user has viewed for a given competitor. For example, the media guidance application may determine a number of March Madness games the user viewed.

At 1212, the control circuitry 404 determines if the user has viewed one or more competitions for the competitor of interest. For example, the media guidance application may determine whether the user has viewed one or more March Madness games to completion.

At 1214, the control circuitry 404 generates for display results display 102, presented on display 412, of the tournament-style competition, results display 102 blacking-out using marker 118, any levels beyond the first level of competition. For example, the media guidance application may determine the user did not watch any games to completion and may generate the March Madness results display, blacking out any levels beyond the first round.

At 1216, the control circuitry 404 determines, from a user profile stored in memory 408 or media guidance data source 518, the levels of competition in which the user has viewed the competitions of the user's competitor of interest. For example, the media guidance application may determine the user viewed one or more March Madness games and determine from the user profile which games were viewed to completion by the user.

FIG. 13 is a flowchart of illustrative steps for generating for display a results display of a tournament-style competition. It should be noted that process 1300 or any step thereof could be performed on, or provided by, any of the devices shown in FIGS. 4-5. For example, process 1300 may be executed by control circuitry 404 (FIG. 4) as instructed by a media guidance application implemented on user equipment 100 (which may have the functionality of any or all of user equipment 502, 504, and/or 506 (FIG. 5)) in order to generate for display the results display. In addition, one or more steps of process 1300 may be incorporated into or combined with one or more steps of any other process or embodiment (e.g., as described in relation to FIGS. 8-12).

At 1302, the control circuitry 404 receives a request from user input interface 410 to generate for display (e.g., on display 412) results display 102 for a tournament-style competition. For example, the media guidance application may receive a request from a user to view the March Madness basketball tournament.

At 1304, the control circuitry 404 determines from profile information (e.g., found in media guidance data source 518) corresponding to the user, a competitor of the tournament-style competition that the user prefers. For example, the media guidance application may retrieve profile information of a user who made the request to generate for display a tournament-style competition and may determine therefrom that the Gonzaga University basketball team is the user's preferred competitor in the March Madness competition.

At 1306, the control circuitry 404 determines progress of the user through time-shifted versions of media assets that portray the competitor competing in the tournament-style competition. For example, the media guidance application may determine that competitor to be the Gonzaga University basketball team and determine the highest level of competition the user has viewed.

At 1308, the control circuitry 404 determines a level of the tournament-style competition corresponding to the progress of the user. For example, the media guidance application may determine the user has viewed Gonzaga basketball games through the first level of competition.

At 1310, the control circuitry 404 generates for display on display 412 results display 102 of the tournament-style competition, the results display blacking-out using marker 118, any levels corresponding to the competitor that are above the level of the tournament-style competition corresponding to the progress of the user. For example, the media guidance application may determine the Gonzaga basketball team made it to the third level of competition and the user has viewed the first level competition. Furthermore, the media guidance application may black out any levels beyond the second level competition to avoid spoiling the outcome of unviewed competitions.

It should be noted that processes 600-1300 or any step thereof could be performed on, or provided by, any of the devices shows in FIGS. 1 and 4-5. For example, any of processes 600-1200 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-1300 may be incorporated into or combined with one or more steps of any other process or embodiment.

It is contemplated that the steps or descriptions of each of FIGS. 6-13 may be used with any other embodiment of this disclosure. In addition, the steps and descriptions described in relation to FIGS. 6-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-13.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, blacking out in results display 102 may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5. Furthermore, processing circuitry, or a computer program, may update settings of the tournament-style competition results display 102, stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:

receiving, using communications circuitry, a request to generate for display a results display of a tournament-style competition;

determining, from user profile information, a preferred competitor of the tournament-style competition;

retrieving directory information for a directory of media assets that are associated with the user profile information;

determining that the directory of media assets does not include at least one media asset from the tournament-style competition that portrays the preferred competitor; and generating for display an option to retrieve the at least one media asset, from the tournament-style competition, that portrays the preferred competitor, from additional directories.

2. The method of claim 1, wherein the generating for display the option to retrieve the at least one media asset, from the tournament-style competition, that portrays the preferred competitor, from the additional directories comprises:

displaying a prompt comprising a user interface option for searching the additional directories;

receiving a selection of the user interface option for searching the additional directories; and retrieving the at least one media asset, from the tournament-style competition, that portrays the preferred competitor, from the additional directories.

3. The method of claim 2, wherein the retrieving the at least one media asset, from the tournament-style competition, that portrays the preferred competitor, from the additional directories further comprises:

requesting access to a network provider media asset directory;

accessing a subset of the network provider media asset directory upon receiving approval of the request for user requested media assets; and searching for specific media assets for the preferred competitor within the subset of the network provider media asset directory for user requested media assets.

4. The method of claim 2, wherein the user interface option is a first user interface option, and wherein the prompt further comprises a second user interface option for not searching the additional directories, the method further comprising:

receiving the selection of the second user interface option for not searching the additional directories; and generating for display, using display circuitry, the results display of the tournament-style competition, the results display omitting any levels beyond a first level of competition to not spoil results of the preferred competitor of the tournament-style competition before at least one media asset from the tournament-style competition that portrays the preferred competitor are consumed.

5. The method of claim 1, wherein the directory of media assets comprises time-shifted versions of media assets stored in memory of a device.

6. The method of claim 1, wherein the additional directories comprise one or more of cable provider remote databases and sports broadcasting network databases.

7. The method of claim 1, wherein the results display of the tournament-style competition comprises a tournament bracket comprising information corresponding to competitors in the tournament-style competition.

8. The method of claim 7, wherein the information corresponding to competitors in the tournament-style competition comprises matchups of teams and results of those matchups in the tournament-style competition.

9. The method of claim 1, wherein the tournament-style competition is associated with a media guidance application.

10. The method of claim 9, wherein the determining, from the user profile information, the preferred competitor of the tournament-style competition comprises:

retrieving profile information associated with a user profile accessible by the media guidance application; and determining that the preferred competitor is stored as a favorite team in the user profile information.

11. A system comprising:

communications circuitry configured to:

receive a request to generate for display a results display of a tournament-style competition; and control circuitry configured to:

determine, from user profile information, a preferred competitor of the tournament-style competition;

retrieve directory information for a directory of media assets that are associated with the user profile information;

determine that the directory of media assets does not include at least one media asset from the tournament-style competition that portrays the preferred competitor; and display circuitry configured to:

generate for display an option to retrieve the at least one media asset, from the tournament-style competition, that portrays the preferred competitor, from additional directories.

12. The system of claim 11, wherein the display circuitry is configured to generate for display the option to retrieve the at least one media asset, from the tournament-style competition, that portrays the preferred competitor, from the additional directories by:

displaying a prompt comprising a user interface option for searching the additional directories;

receiving, via the communications circuitry, a selection of the user interface option for searching the additional directories; and retrieving, via the control circuitry, the at least one media asset, from the tournament-style competition, that portrays the preferred competitor, from the additional directories.

13. The system of claim 12, wherein the control circuitry is configured to retrieve the at least one media asset, from the tournament-style competition, that portrays the preferred competitor, from the additional directories by:

requesting access to a network provider media asset directory;

accessing a subset of the network provider media asset directory upon receiving approval of the request for user requested media assets; and searching for specific media assets for the preferred competitor within the subset of the network provider media asset directory for user requested media assets.

14. The system of claim 12, wherein the user interface option is a first user interface option, wherein the prompt further comprises a second user interface option for not searching the additional directories, and wherein the control circuitry is further configured to:

receive, via the communications circuitry, the selection of the second user interface option for not searching the additional directories; and generate for display, using the display circuitry, the results display of the tournament-style competition, the results display omitting any levels beyond a first level of competition to not spoil results of the preferred competitor of the tournament-style competition before at least one media asset from the tournament-style competition that portrays the preferred competitor are consumed.

15. The system of claim 11, wherein the directory of media assets comprises time-shifted versions of media assets stored in memory of a device.

16. The system of claim 11, wherein the additional directories comprise one or more of cable provider remote databases and sports broadcasting network databases.

17. The system of claim 11, wherein the results display of the tournament-style competition comprises a tournament bracket comprising information corresponding to competitors in the tournament-style competition.

18. The system of claim 17, wherein the information corresponding to competitors in the tournament-style competition comprises matchups of teams and results of those matchups in the tournament-style competition.

19. The system of claim 11, wherein the tournament-style competition is associated with a media guidance application.

20. The system of claim 19, wherein the control circuitry is configured to determine, from the user profile information, the preferred competitor of the tournament-style competition by:

retrieving profile information associated with a user profile accessible by the media guidance application; and determining that the preferred competitor is stored as a favorite team in the user profile information.

* * * * *